(12) United States Patent
Li et al.

(10) Patent No.: US 8,658,561 B2
(45) Date of Patent: Feb. 25, 2014

(54) LAYERED SOLID SORBENTS FOR CARBON DIOXIDE CAPTURE

(75) Inventors: Bingyun Li, Morgantown, WV (US); Bingbing Jiang, Morgantown, WV (US); McMahan L. Gray, Pittsburgh, PA (US); Daniel J. Fauth, Pittsburgh, PA (US); Henry W. Pennline, Bethel Park, PA (US); George A. Richards, Morgantown, WV (US)

(73) Assignee: West Virginia University, Morgantown, WV (US)

(*) Notice: Subject to any disclaimer, the term of this patent is extended or adjusted under 35 U.S.C. 154(b) by 0 days.

(21) Appl. No.: 13/611,651

(22) Filed: Sep. 12, 2012

(65) Prior Publication Data

US 2013/0078172 A1 Mar. 28, 2013

Related U.S. Application Data

(60) Provisional application No. 61/573,746, filed on Sep. 12, 2011.

(51) Int. Cl.
*B01J 20/26* (2006.01)

(52) U.S. Cl.
USPC .......................................................... 502/402

(58) Field of Classification Search
USPC .......... 423/228, 226, 230; 428/216, 304, 319, 428/315; 427/470; 502/402
See application file for complete search history.

(56) References Cited

PUBLICATIONS

EPA: Greenhouse Gases Threaten Public Health and the Environment/Science overwhelmingly shows greenhouse gas concentrations at unprecedented levels due to human activity, 2009, http://yosemite.epa.gov, 1-2.
Tsuda, T., Fujiwara, T., Takteani, Y., Saeguas, T. 1992. Chem. Lett. 21, 2161-2164.
Decher, G. 1997. Science 277(5330), 1232-1237.
FalkPedersen, O., Dannstrom, H. 1997. Energy Conyers. Manage. 38, 81-86.
Hook, R.J 1997. Ind. Eng. Chem. Res. 36, 1779-1790.
Meisen, A. Shuai, X. 1997. Energy Conyers. Manage. 38, 37-42.
Mendelsohn, J.D., Barret, C.J., Chan, V.V., Pal, A.J., Mayes, A.M., Rubner, M.F. 2000. Langmuir 16, 5017-5023.
Satyapal, S., Filburn, T., Trela, J., Strange, J. 2001. Energy & Fuels 15(2), 250-255.
Siriwardane R.V., Shen, M.S., Fisher, E.P., Poston, J.A. 2001. Energy & Fuels 15, 279-284.
Rao, A.B., Rubin, E.S. 2002. Environ. Sci. Technol. 36, 4467-4475.
Xu, X.C., Song, C.S., Andresen, J.M., Miller, B.G., Scaroni, A.W. 2002. Energy & Fuels 16, 1463-1469.

(Continued)

*Primary Examiner* — Colleen Dunn
*Assistant Examiner* — Haytham Soliman
(74) *Attorney, Agent, or Firm* — Buchanan Ingersoll & Rooney; Craig G. Cochenour, Esq

(57) ABSTRACT

A solid sorbent for the capture and the transport of carbon dioxide gas is provided having at least one first layer of a positively charged material that is polyethylenimine or poly (allylamine hydrochloride), that captures at least a portion of the gas, and at least one second layer of a negatively charged material that is polystyrenesulfonate or poly(acryclic acid), that transports the gas, wherein the second layer of material is in juxtaposition to, attached to, or crosslinked with the first layer for forming at least one bilayer, and a solid substrate support having a porous surface, wherein one or more of the bilayers is/are deposited on the surface of and/or within the solid substrate. A method of preparing and using the solid sorbent is provided.

29 Claims, 28 Drawing Sheets

(56) References Cited

PUBLICATIONS

Xu, X.C., Song, C.S., Andresen, J.M., Miller, B.G., Scaroni, A.W. 2003. Microporous Mesoporous Mater. 62, 29-45.

White C.M., Strazisar, B.R., Granite, E.J., Hoffman, J.S., Pennline, H.W. 2003. J. Air Waste Manag. Assoc. 53(6), 645-715.

Volodkin, D.V., Petrov, A.I., Prevot, M., Sukhorukov, G.B. 2004 Langmuir 20(8), 3398-3406.

Gray, M.L., Soong, Y., Champagne, K.L., Baltrus, J.R.W., Stevens, J., Toochinda, P., Chuang, S.S.C. 2004. Sep. Purif. Technol. 35, 31-36.

Li, B., Haynie, D.T. 2004. Biomacromolecules 5(5), 1667-1670.

Aaron, D., Tsouris, C. 2005. Sep. Sci. Tech. 40, 321-348.

Filburn, T., Helble, J.J., Weiss, R.A. 2005. Ind. Eng. Chem. Res.44, 1542-1546.

Gray, M.L., Soong, Y., Champagne, K.J., Pennline, H., Baltrus, J.P., Stevens, R.W., Khatri, R., Chuang, S.S.C., Filburn, T. 2005. Fuel Process. Techn. 86(14-15), 1449-1455.

Knowles, G.P., Graham, J.V., Delaney, S.W., Chaffee, A.L. 2005. Fuel Process. Technol. 86, 1435-1448.

Ma'mun, S., Nilsen, R., Svendsen, H.F., Juliussen, O. 2005. Chem, Eng. Sci. 60, 630-634.

Shigemoto, N., Yanagihara, T., Sugiyama, S., Hayashi, H. 2005. J. Chem. Eng. Jpn. 38, 711-717.

Xu, X.C., Song, C.S., Miller, B.G., Scaroni, A.W. 2005. Ind. Eng. Chem. Res. 44, 8113-8119.

Hicks, J.C., Jones, C.W. 2006. Langmuir 22,2676-2681.

Khatri, R.A., Chuang, S.S.C., Soong, Y., Gray, M. 2006. Energy & Fuels 20, 1514-1520.

Luebke, D. Myers, C., Pennline, H. 2006. Energy & Fuels 20, 1906-1913.

Mandal, B.P., Bandyopadhyay S.S. 2006. Chem. Eng. Sci. 61, 5440-5447.

Song, C.S. 2006. Catalysis Today 115(1-4), 2-32.

Song, H.J., Lee, S., Maken, S., Park, J.J., Park, J.W. 2006. Fluid Phase Equilib. 246, 1-5.

Zhong, Y., Li, B., Haynie, D.T. 2006. Biotechnol. Prog. 22(1), 126-132.

Harlick, P.J.E, Sayari, A. 2007. Ind. Eng. Chem. Res 46, 446-458.

Lee, S., Song, H.J., Maken, S., Park, J.W. 2007. Ind. Eng. Chem. Res. 46, 1578-1583.

Raupach, M.R., Marland, G., Ciais, P., Le Quere, C., Canadell, J.G., Klepper, G., Field, C.B. 2007. Proce. Nat. Acade. Sci. U.S.A. 104(24), 10288-10293.

Schladt, M., Filburn, T.P., Helble, J.J., 2007. Ind. Eng. Chem. Res. 46, 1590-1597.

Figueroa, J.D., Fout, T., Plasynski, S., McIlvried, H., Srivastava R.D. 2008. Int. J. Greenhouse Gas Control 2(1), 9-20.

Gray, M.L., Champagne, K.J., Fauth, D., Baltrus, J.P., Pennline, H. 2008. Inter. J. Greenhouse Gas Contr. 2, 3-8.

Hicks, J.C., Drese, J.H., Fauth, D.J., Gray, M.L., Qi, G.G., Jones, C.W. 2008. J. Amer. Chem. Soc. 130(10), 2902-2903.

Hoffman, J., Richards, G.A., Pennline, H.W., Fischer, D., Keller, G. 2008. Proceedings of the 33rd International Technical Conference on Coal Utilization and Fuel Systems, Clearwater FL, Jun. 1-5, 2008, Paper 120. Coal Technology Association, Gaithersburg MD, ISBN 978-0-932066-336.

Serna-Guerrero, R., Da'na, E., Sayari, A. 2008. Ind. Eng. Chem. Res. 47, 9406-9412.

Zhao, Q., Li, B. 2008. Nanomedicine: NBM 4, 302-310.

Choi, S., Drese, J.H., Jones, C.W. 2009. ChemSusChem 2(9), 796-854.

Drese, J.H., Choi, S., Lively, R.P., Koros, W.J., Fauth, D.J., Gray, M.L., Jones, C.W. 2009. Adv. Func. Mater. 19(23), 3821-3832.

Gray, M.L., Hoffman, J.S., Hreha, D.C., Fauth, D.J., Hedges, S.W., Champagne, K.J., Pennline, H.W. 2009. Energy & Fuels 23, 4840-4844.

Jiang, B., Li, B. 2009. Int. J. Nanomedicine 4, 37-53.

Li, B., Jiang, B., Boyce, B., Lindsey, B. 2009. Biomaterials 30, 2552-2558.

Ma, X.L, Wang, X.X., Song, C.S. 2009. J. Am. Chem. Soc. 131(16), 5777-5783.

Wang, X., Schwartz, V., Clark, J.C., Ma, X.L., Overbury, S.H., Xu, X.C., Song, C.S. 2009. J. Phys. Chem. C113, 7260-7268.

Alesi Jr., W.R., Gray, M., Kitchin, J.R. 2010. ChemSusChem 3, 948-956.

Jiang, B., DeFusco, E., Li, B. 2010 Biomacromolecules 11, 3630-3637.

Li, W., Choi, S., Drese, J.H., Hornbostel, M., Krishnan, G., Eisenberger, P.M., Jones, C.W. 2010. ChemSusChem 3, 899-903.

Li, B., Jiang, B., Fauth, D.j., Gray, M.L., Pennline, H.W., Richards, G.A. 2011. Chem Commun.47, 1719-1721.

| Table 2.1. CO$_2$ capture capacity of amine-multilayered PMMA solid sorbents under pure CO$_2$ atmosphere. |||| 
|---|---|---|---|
| Sample | CO$_2$ capture capacity |||
| | mol·CO$_2$/(kg sorbent) | mol·CO$_2$/(kg PEI)[b] | mol·CO$_2$/mol·N[b,c] |
| (PEI/PSS)$_5$ PMMA | 0.8 | 12.8 | 0.56 |
| (PEI/PSS)$_{10}$ PMMA | 1.7 | 17.4 | 0.77 |
| (PEI/PSS)$_{10}$ PMMA[a] | 1.4 | 16.8 | 0.74 |
| (PEI/PAA)$_{10}$ PMMA | 0.1 | 1.8 | 0.08 |
| (PAH/PSS)$_{10}$ PMMA | 0.5 | 9.6 | 0.55 |

[a] Prepared in organic solvents.
[b] Calculated from mass increase before and after polymer deposition, assuming equal amounts of positively- and negatively-charged polymers were deposited.
[c] Amine efficiency.

Fig. 3

| Table 2.2. CO$_2$ desorption from PEI/PSS multilayered and PEI-impregnated PMMA sorbents under pure CO$_2$ atmosphere. ||||
|---|---|---|---|
| Sample | CO$_2$ capture capacity, mol·CO$_2$/(kg sorbent) | Time for 50% desorption, min[a] | 30-min desorption, mol·CO$_2$/(kg sorbent)[a] |
| (PEI/PSS)$_5$ PMMA | 0.8 | 3 | 0.75 |
| (PEI/PSS)$_{10}$ PMMA | 1.7 | 16 | 1.02 |
| PEI impregnated | 0.8 | 36 | 0.65 |
| PMMA | 3.4 | 300 | 0.37 |

[a] Data obtained from Figures 11 and 12

— (PEI/PSS)₅ PMMA

— — PEI-impregnated PMMA(PEI concentration of 800 mg/ml was used at a 1:2 ratio of PEI to PMMA)

— (PEI/PSS)$_5$ PMMA of 0.8 mol·CO$_2$/(kg sorbent)

— — PEI-impregnated PMMA of 3.4 mol·CO$_2$/(kg sorbent) (PEI concentration of 400 mg/ml was used at a 1:1 ratio of PEI to PMMA)

∘ ∘ ∘ (PEI/PSS)$_{10}$ PMMA of 1.7 mol·CO$_2$/(kg sorbent)

I. Layer by Layer Self Assembly Chamber
II. Porous Sorbent Substrate
III. Filter Support Stability of PEI/PSS sorbents in water.

Designing of IL monomers and IL-based sorbent
----Synthesis route
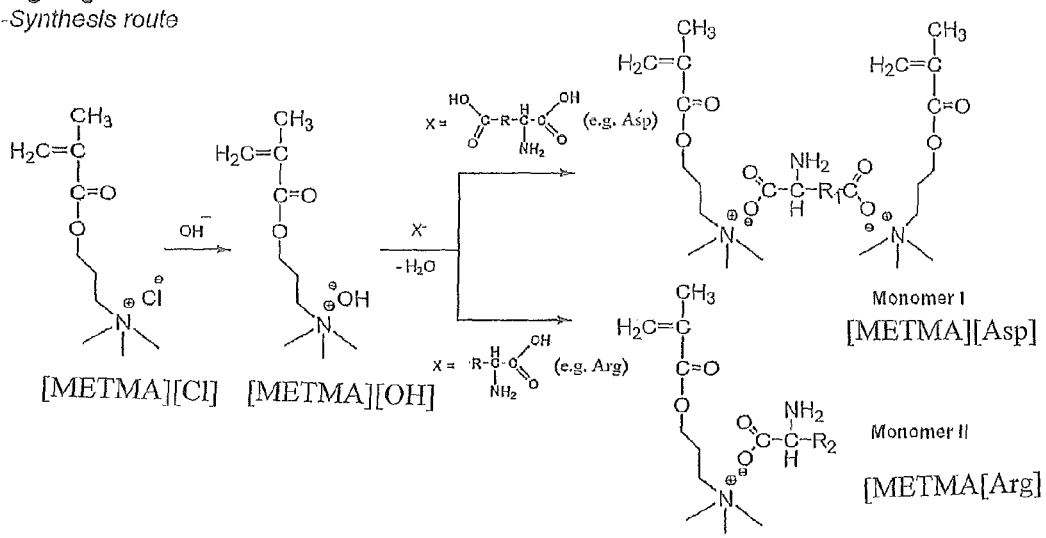
----Sorbent fabrication
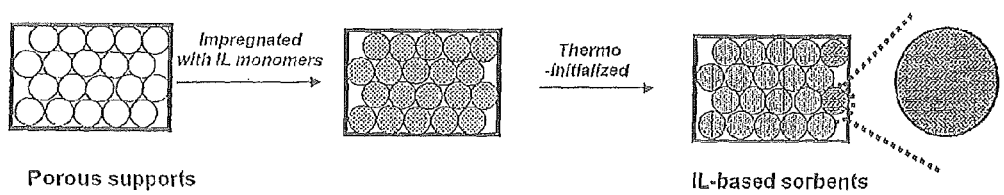
Fig. 16

Synthesis and characterization of ionic liquid monomers

Morphologies of IL-impregnated PMMA sorbent

SEM images of AAIL-impregnated PMMA sorbents (a,c) before and (b,d) after polymerization. Scale bar is 500nm.

SEM Images of AAIL-impregnated PMMA sorbents. Surface and cross-section surface. Scale bar is 1μm.

CO2 adsorption capacity of IL-impregnated PMMA sorbent
Effects of polymerization, crosslinking and IL-loading content:

(a) $CO_2$ adsorption capacity before and after polymerization reaction

| AAIL-loading content (20 wt%/sorbent) | $CO_2$ capacity (mol/kg sorbent) | AA efficiency (mol/ mol amino acid) |
|---|---|---|
| Non-polymerized | 0.73 ± 0.4 | 1.27 |
| Polymerized | 0.88 ± 0.3 | 1.53 |

Arginine capacity in solvent: 1.7 mol/mol AA.

Fig. 21 a

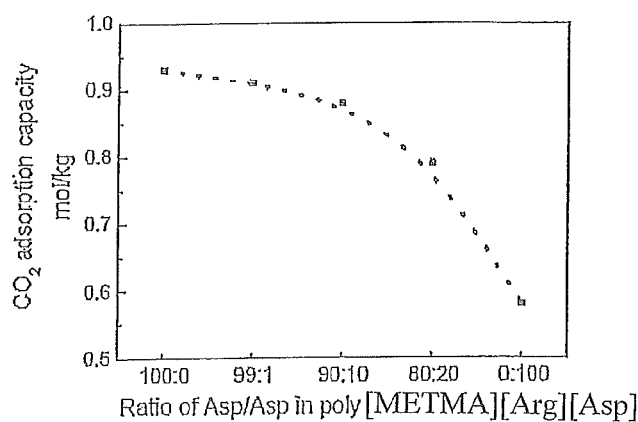

(b) Effect of crosslinking on $CO_2$ adsorption capacity

Fig. 21 b (c) Effect of IL-loading capacity on $CO_2$ adsorption capacity (d) $CO_2$ adsorption capacity and amino acid efficiency

| AAIL-wt % content in sorbent | CO2 capacity (mol/kg sorbent) | AA efficiency (mol/mol amino acid) |
|---|---|---|
| 10 | 0.48 | 1.67 |
| 20 | 0.88 | 1.53 |
| 40 | 1.24 | 1.08 |
| 50 | 1.47 | 0.97 |
| 58 | 0.92 | 0.55 |
| 65 | 0.78 | 0.42 |

(e) $CO_2$ adsorption capacity of IL-impregnated in different substrate

| Support material Substrate | CO2 capacity (mol/kg sorbent) | AA efficiency (mol/mol amino acid) |
|---|---|---|
| Q 10 | 0.78 | 1.36 |
| PMMA | 0.88 | 1.53 |

Fig. 21 e

Capacity at high temperature

II Layer-by-layer self-assembly of polymeric ionic liquids
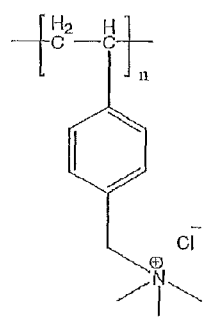
Poly-[VBTMA][Cl]
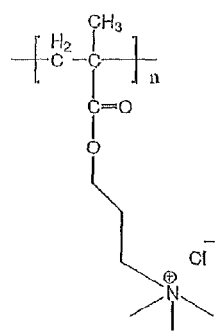
Poly-[METMA][Cl]
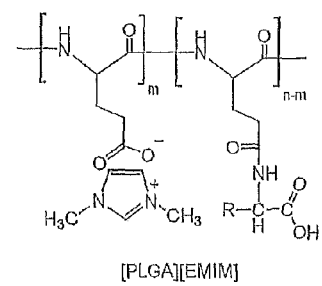
[PLGA][EMIM]
Fig. 23

Synthesis and characterization of ionic liquid monomers (a) Solubility of polycation and polyanion

| IL/Poly (IL) | Solvent | Non-solvent |
|---|---|---|
| [EMIM][Br] | H₂O; MeOH, EOH | --- |
| Arginine | H₂O, TFE | MeOH; EtOH; acetone; THF, DMSO |
| PLGA | H₂O, TFE | MeOH; EtOH; acetone; THF, DMSO; |
| [VBTMA][Cl] | H₂O; MeOH, EHO; acetone; THF, DMSO; TFE | --- |
| Poly[VBTMA][Cl] | H₂O, DMSO; THF; TFE | MeOH; EtOH |
| [PLGA][EMIM] | H₂O, DMSO, TFE | MeOH |

TFE—Trifluoroethanol; MeOH—Methanol; EtOH—Ethanol; THF—Tetrahydrofuran; DMSO--Dimethyl sulfoxide

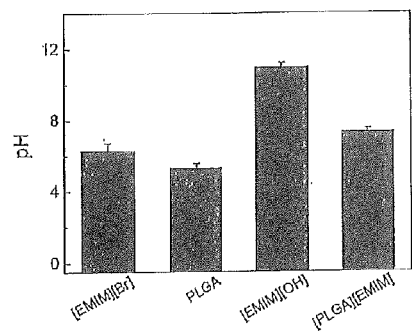

(b) pH monitoring in the synthesis process of [PLGA][EMIM]

Fig. 25

LAYERED SOLID SORBENTS FOR CARBON DIOXIDE CAPTURE

CROSS-REFERENCE TO RELATED APPLICATION

This utility patent application claims the benefit of co-pending U.S. Provisional Patent Application Ser. No. 61/573,746, filed on Sep. 12, 2011. The entire contents of U.S. Provisional Patent application Ser. No. 61/573,746 is incorporated by reference into this utility patent application as if fully written herein.

STATEMENT REGARDING FEDERALLY SPONSORED RESEARCH

Certain embodiments of this invention were made with Government support in conjunction with the National Energy Technology Laboratory, Pittsburgh, Pa., under RES contract number DE-FE0004000 awarded by the U.S. Department of Energy. The Government may have certain rights in the invention.

BACKGROUND OF THE INVENTION

1. Field of the Invention

Nano-layered sorbents for $CO_2$ capture, for the first time, were developed using layer-by-layer nanoassembly. A $CO_2$-adsorbing polymer and a strong polyelectrolyte were alternately immobilized within a porous sorbent substrate. The solid sorbents of the present invention have fast $CO_2$ adsorption and desorption properties and their $CO_2$ capture capacity increased with increasing number of nano-layers of the $CO_2$-adsorbing polymer.

2. Description of the Background Art

The emission of fossil fuel $CO_2$ to the atmosphere is implicated as the predominant cause of global climate change; therefore, advanced $CO_2$ capture technologies are of the utmost importance. Fossil fuels are the main energy supply in the world. However, the emission of $CO_2$ from fossil fuel combustion has raised great concerns about the relation between anthropogenic $CO_2$ and global warming.

According to the Energy Information Agency, approximately 40% of the U.S. $CO_2$ emission is associated with electricity generation. Consequently, the capture and sequestration of $CO_2$ from power-plant flue-gas streams is an essential scenario for carbon management. Current post-combustion $CO_2$ capture and sequestration technologies require three main steps: (i) capture $CO_2$ from the stack gas, (ii) compress the nearly pure $CO_2$ to about 2,000 psi, and (iii) permanently "bury" or store the $CO_2$ in certain geological structures deep in the earth. These processes can require up to one-third of the produced power-plant energy, which would otherwise be used as electrical energy for customers. Most of the energy cost of the three steps lies with step (i), i.e. $CO_2$ capture. Monoethanolamine (MEA), used as a major aqueous wet scrubbing solvent, has high operating costs due to their heat of sorption plus the sensible and latent heating of the solution. The latent and sensible heating accounts for approximately ½ of the total regeneration energy for conventional liquid solvent systems. The presence of $H_2O$, ~70 wt. % in the MEA-based solvent, is a major cause of energy usage above that required for simple desorption of $CO_2$. The energy penalty associated with solvent regeneration can be reduced by concentrating the amine solution, thereby reducing the sensible and latent energy needs connected with the water. However, highly concentrated MEA may lead to equipment-corrosion problems and unwanted foaming. Facing these facts and challenges researchers have recently proposed the concept of solid sorbents for $CO_2$ capture. Compared to liquid amines dissolved in water, the solid sorbents may avoid much of the latent heat duty connected with aqueous solvent regeneration. Studies have indicated that solid sorbents may have the potential to require substantially less energy (e.g. a reduction of 30-50%) for regeneration than the current MEA-based $CO_2$ scrubbing processes.

Carbon dioxide ($CO_2$) is considered to be one of the major greenhouse gases directly influencing global climate change and human health, as more than 30 billion tons of anthropogenic $CO_2$ is annually added to the atmosphere, and its emission is continuously increasing. The United States is the $10^{th}$ largest emitter of $CO_2$ emissions per capita as of 2004 (Raupach et al., 2007). Due to the continuous rise of $CO_2$ in the atmosphere, extensive interest has been shown in developing carbon sequestration technologies, which may trap and store large quantities of $CO_2$ from concentrated sources such as power plants. Capture is a key step in the overall carbon sequestration technologies. Various approaches have been reported for capturing and separating $CO_2$ such as aqueous amine sorption, membrane separation, and cryogenic separation. Aqueous amine absorption has already been applied on the commercial scale for $CO_2$ separation from power plant flue gas. However, aqueous amine absorption has high operating costs due to their heat of sorption plus the sensible and latent heating of the solution. Extensive water is required to prevent equipment corrosion and avoid airflow problems, which consequently results in high energy requirements for regeneration. Meanwhile, loss of amine components due to degradation and evaporation at moderate temperatures is another problem for aqueous amine absorption).

To avoid these problems, solid sorbents have been developed, e.g. amine immobilized materials including silica, fly ash, molecular sieves, activated carbons, and polymer supports. These amine solid sorbents offer several advantages including their capability to be used at low pressure for $CO_2$ recovery, low capital cost, and low regeneration energy compared to aqueous amine solvents. Amines can be physically absorbed or chemically bonded in porous sorbents, and $CO_2$ capture is mainly based on the interaction between primary and secondary amines with gaseous $CO_2$ molecules. Although macromolecular amines may have better regeneration capacity and thermal stability, amines with low molecular weights have been primarily studied to date.

While solid sorbents may reduce regeneration energy, it is advantageous that the sorbent structure be tailored to minimize diffusion resistance, during both the $CO_2$ capture, and subsequent regeneration. Minimal diffusion resistance will insure that the highest $CO_2$ capacity is achieved in the shortest time—reducing the needed size of reactors and materials handling. Thus, it would be desirable to develop a technique where adsorbent chemistry could be deposited on high surface area supports, while creating uniform layers of desired thickness.

SUMMARY OF THE INVENTION

The present invention provides a solid sorbent comprising at least one first layer of a material that captures at least a portion of a gas, and at least one second layer of a second material that transports the gas, the second layer of material is in juxtaposition to, attached to, or crosslinked with the first layer such that the first layer of material and the second layer of material form one bilayer, and a solid substrate support having a porous surface, wherein the bilayer is deposited onto the surface of the substrate and/or is deposited into/within the solid substrate. The solid sorbent of has at least one alternating layer of the first layer of material and the second layer of material forming at least one bilayer. Preferably, the first layer of the material is different than the second layer of the material in each bilayer. More preferably, the first layer of material is a positively charged material and wherein the second layer of material is an oppositely charged material relative to the first layer of material. Most preferably, the first layer of material is a positively charged polyelectrolyte and wherein the second layer of material is a negatively charged polyelectrolyte.

In another embodiment of the present invention, the solid sorbent, as described herein, includes wherein the first layer of material is a polymer and wherein the second layer of material is a polymer. Preferably, the first layer of said material is selected from the group consisting of polyethylenimine and poly(allylamine hydrochloride), and wherein the second layer of material is selected from the group consisting of polystyrenesulfonate and poly(acrylic acid). It will be understood that the solid sorbent has a first layer that is a positively charged polymer and wherein said second layer is an oppositely charged polymer relative to the polymer of the first layer.

The solid substrate support is selected from the group consisting of polymethylmethacrylate, silica, silicone, glass, a metal, and a colloid of an inorganic and organic material. Preferably, the solid sorbent support has a porosity having an average diameter size ranging from 1 nanometer to greater than 200 nanometers.

Another embodiment of this invention provides wherein each bilayer of the solid sorbent has a thickness of at least 1 nanometer. Preferably, the solid sorbent comprises from 2 to 10 bilayers wherein each bilayer has a thickness of from 1 to 10 nanometers.

In another embodiment of this invention, the solid sorbent, as described herein, has a first layer of material that is an amine polymer. In a most preferred embodiment of this invention, the solid sorbent, as described herein, comprises a first layer of material that is polyethylenimine and a second layer of material that is polystyrenesulfonate.

Another embodiment of the present invention provides wherein the solid sorbent includes a first and a second layers of materials that are selected from the group of ionic liquid monomers and poly-ionic liquid polymers. The ionic liquid monomers are selected from the group of noncrosslinked and crosslinked monomers. In a preferred embodiment of this invention, the solid sorbent, as described herein, comprises a poly ionic liquid polymer that is formed from monomers selected from the group consisting of 2-(methacryloyloxy) ethyl-trimethylammonium chloride [METMA][Cl], p-vinyl-benzonyltrimethylammonium chloride [VBTMA][Cl], arginine [Arg], aspartic acid [Asp], poly(L-glutamic acid) [PLGA], 1-ethyl-3-methylimidazolium [EMIM], and combinations thereof. In a more preferred embodiment of this invention, the solid sorbent, as described herein, is a ionic liquid polymer selected from the group of poly[p-vinylbenzonyltrimethylammonium chloride][Cl], poly[p-vinylbenzonyltrimethylammonium chloride][Arg], poly[2-(methacryloyloxy)ethyltrimethylammonium chloride][Cl], [PLGA][EMIM], and [PLGA-Arg][EMIM]. Another embodiment of this invention provides a solid sorbent, as described herein, wherein the poly ionic liquid polymer is poly [METMA][Arg][Asp], a copolymer synthesized from polymerization of [2-(methacryloyloxy)ethyltrimethylammonium chloride][Arginine] and [2-(methacryloyloxy)ethyltrimethylammonium chloride][Aspartic acid].

In yet another embodiment of this invention, a method of preparing a solid sorbent is provided, comprising the steps of employing electrostatic layer by layer nanoassembly of drawing a positively charged polymer in aqueous media through a porous sorbent support material, as described herein, under sufficient vacuum pressure for a period of time ranging from one minute to greater than fifteen minutes for forming a positively charged layer of the positively charged polymer on the surface of and/or within the porous sorbent support material resulting in a treated porous sorbent support material, rinsing the treated porous sorbent support material with water, employing electrostatic layer by layer nanoassembly of drawing a negatively charged polymer in aqueous media through the treated porous sorbent support material under sufficient vacuum pressure for a period of time ranging from 1 minute to greater than fifteen minutes for forming a negatively charged layer of the negatively charged polymer in juxtaposition to, attached to or crosslinked with the positively charged layer resulting in the formation of one bilayer of the positively charged layer and the negatively charged layer being deposited on or within the porous solid sorbent support, and rinsing the solid sorbent support having the bilayer resulting in one cycle of deposition of the bilayer on the surface of and/or within the porous sorbent support material, and optionally repeating the above steps for forming one or more successive cycles of bilayer deposition. The method includes wherein the positively charged polymer is selected from the group consisting of polyethylenimine and poly(allylamine hydrochloride), and wherein the negatively charged polymer is selected from the group consisting of polystyrenesulfonate and poly(acrylic acid). Preferably, the method includes wherein the positively charged polymer is polyethylenimine and wherein the negatively charged polymer is polystyrenesulfonate. Another embodiment of this invention provides the formation of the layers based on other interactions such as hydrogen bonding. The layers may also go through post-assembly treatment (e.g. crosslinking and deprotonation treatment of the positively charged polymers via pH shift. Another embodiment of this invention provides a method of capturing carbon dioxide from an effluent pollutant waste stream using the solid sorbent of this invention.

In another embodiment of this invention, the method, as described herein, includes wherein the positive and the negative charged polymers are selected from the group of poly[p-vinylbenzonyltrimethylammonium chloride][Cl], poly[p-vinylbenzonyltrimethylammonium chloride][Arg], poly[2-(methacryloyloxy)ethyl-trimethylammonium chloride][Cl], [PLGA][EMIM], and [PLGA-Arginine][EMIM].

Another embodiment of the method of the present invention as described herein includes wherein the positively and negatively charged polymers form a poly ionic liquid polymer selected from the group consisting of poly [METMA][Arginine][Aspartic acid], a copolymer synthesized from polymerization of [2-(methacryloyloxy)ethyltrimethylammonium chloride][Arginine] and [2-(methacryloyloxy)ethyl-trimethylammonium chloride][Aspartic acid]. The solid sorbent and method of preparting the same will be more fully understood from the following descriptions of the invention, the drawings, and the claims appended hereto.

BRIEF DESCRIPTION OF THE DRAWINGS

FIG. 1($b$) shows the fluorescence intensity of RhoB-PEI vs. number of PEI/PSS bilayers inside PMMA sorbents. Inset shows the circled area that was used for fluorescence measurements. FIG. 1 (c) shows the thickness vs. number of PEI/PSS bilayers on planar substrates. FIG. 1 (d) shows a schematic diagram of nano-layered PEI/PSS solid sorbents.

FIG. 2(a) shows the $CO_2$ adsorption capacity vs. number of PEI/PSS bilayers.

FIG. 3 shows the carbon dioxide capture capacity of amine-multilayered PMMA solid sorbents under pure carbon dioxide atmosphere.

FIG. 4 shows carbon dioxide desorption from PEI/PSS multilayered and PEI-impregnated PMMA sorbents under pure carbon dioxide atmosphere.

FIG. 16 shows the synthesis route for IL (ionic liquid) monomers and fabrication of IL based sorbents. Crosslinkable IL based solid sorbents enhance thermo stability of the sorbents and reduce the leak of amines.

FIGS. 19 (a and c) are before polymerization, and FIGS. 19 (b and d) after polymerization. The scale bar is 500 nm (nanometers).

FIG. 23 shows the structures of the poly(IL)s of the present invention.

FIG. 25(a) shows the solubility of polycation and polyanion liquid ionic monomers of the present invention. FIG. 25(b) shows the pH monitoring in the synthesis process of [PLGA][EMIM].

FIG. 26(a) shows the effect of types of polycations on LBL assembly of poly(IL)s. FIG. 26(b) shows the effect of medium environment on LBL assembly of poly(IL)s. The multilayer film deposition was performed on planar PMMA sheets.

FIG. 28(a) shows the effect of molecular weight of polycations on LBL assembly of poly(IL)s. FIG. 28(b) shows the effect of graft ratio of [EMIM] in [PLGA-Arg][EMIM] on LBL assembly of poly(IL)s.

DETAILED DESCRIPTION OF THE INVENTION

The present invention provides advanced solid sorbents that are fabricated using a recently evolved nanotechnology, i.e. electrostatic layer-by-layer (LBL) nanoassembly along with a vacuum or pressure applied to draw the ionic liquid monomers or polymers through the sorbent material. The LBL technique of this invention may be scaled to very large quantities. In the present invention, a $CO_2$-adsorbing amine compound, polyethylenimine or PEI, was successfully nano-layered into a porous supporting substrate, and the developed solid sorbents show advanced $CO_2$ capture properties. Results, described herein, show that layers of desired thickness can be deposited such that equilibrium adsorption capacity is proportional to the number of layers, this, demonstrating excellent control of the deposition process. Sorbents produced in this manner allow careful evaluation of diffusion resistance limits in experimental development of new sorbents, as well as provide a potential method for larger scale production of highly-efficient sorbents.

Figure 8:
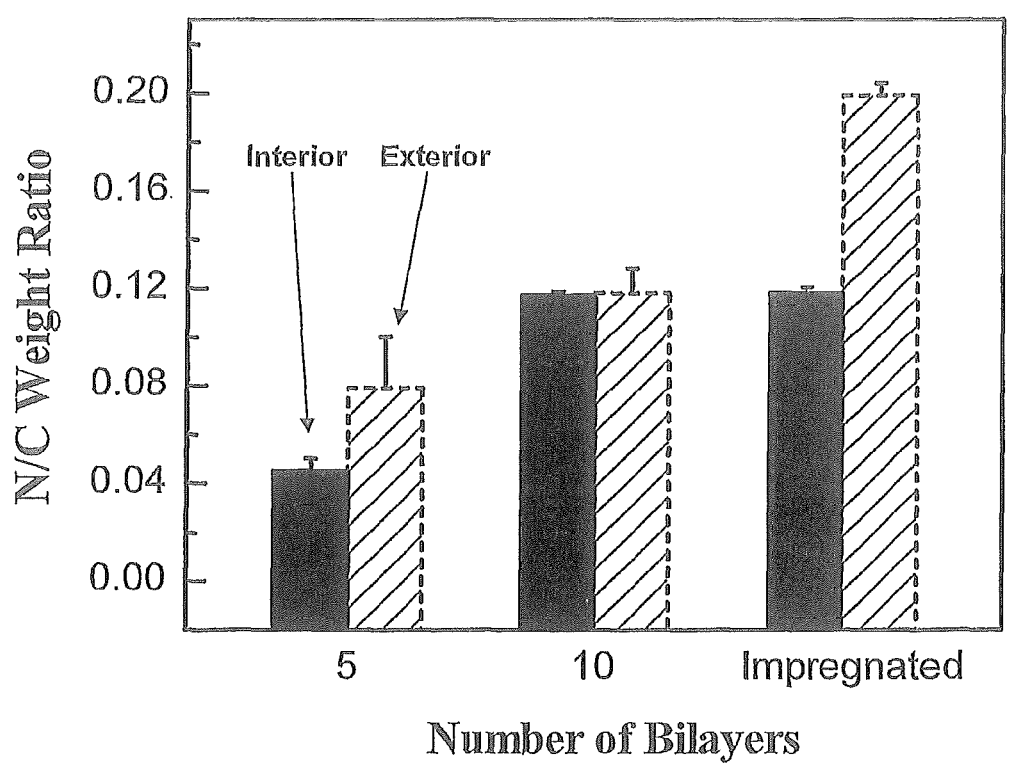
FIG. 8 shows the N/C weight ratio of PEI/PSS multilayered and PEI-impregnated PMMA sorbents.
Figure 10:
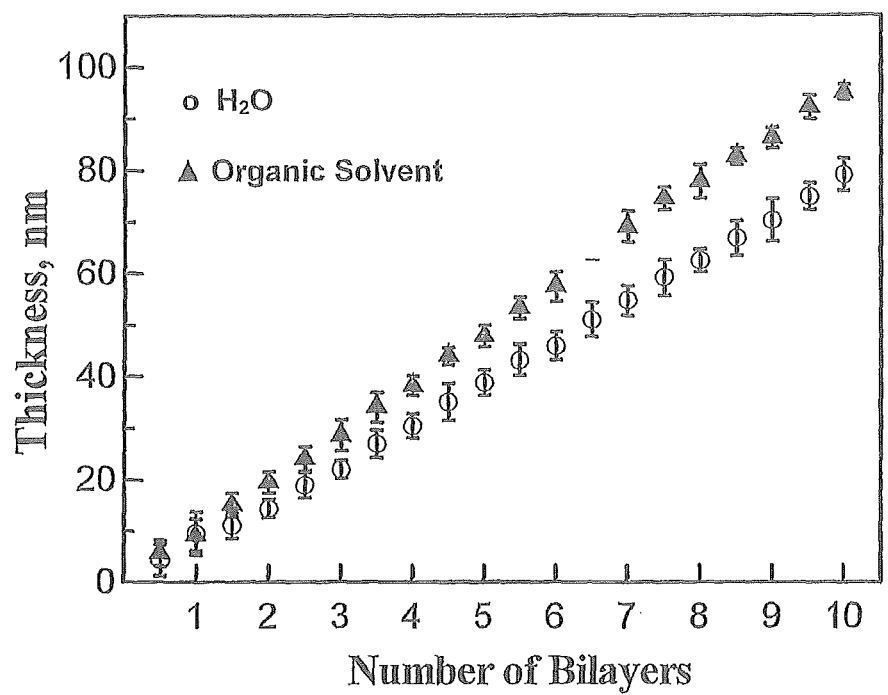
FIG. 10 shows the multilayer thickness versus number of PEI/PSS bilayers which were assembled on planar surfaces of PMMA sheets in aqueous or organic medium.

In the present invention, nano-layered solid sorbents were formed using LBL (or LbL, or Lbl, or layer by layer) nanoassembly in conjunction with a vacuum. PEI, a common $CO_2$-adsorbing polymer, was adsorbed into porous supporting substrates, i.e. polymethylmethacrylate (PMMA) particles, using LBL nanoassembly technology under vacuum. Upon each bilayer deposition of a $CO_2$-adsorbing polymer (i.e. PEI) and an oppositely-charged polyelectrolyte (i.e. polystyrene sulfonate or PSS) (see FIG. 5), the nitrogen/carbon (N/C) ratio (see FIG. 8) and the fluorescent intensity of Rhodamine B labeled PEI (RhoB-PEI) (see FIG. 6) increased approximately linearly with increasing number of PEI/PSS bilayers. Also, thickness of the polymer nano-layers increased with increasing number of PEI/PSS bilayers (FIG. 10); each bilayer was found to be preferably approximately from 1 to 10 nm thick, although thickness of the bilayers may be made greater than several micrometers if desired.

LBL nanoassembly has been widely studied to prepare multiple nano-layers on planar or spherical surfaces, and the formation of multiple layers is mainly due to the reversal of surface charge after each polyelectrolyte deposition, as reported in:

[1] G. Decher, *Science*, 1997, 277(5330), 1232.
[2] B. Li and D. T. Haynie, *Biomacromolecules*, 2004, 5(5), 1667.
[3] X. Zhang, F. Shi, X. Yu, H. Liu, Y. Fu, Z. Q. Wang, L. Jiang and X. Y. Li, *J. Am. Chem. Soc.*, 2004, 126(10), 3064.
[4] B. Ding, J. Gong, J. H. Kim and S. Shiratori, *Nanotechnology*, 2005, 16, 785.
[5] K. B. Guice, M. E. Caldorera and M. J. McShane, *J. Biomed. Optics*, 2005, 10(6), 064031.
[6] K. K. Chia, R. E. Cohen and M. F. Rubner, *Chem. Mater.*, 2008, 20(21), 6756.
[7] J. B. Schlenoff, A. H. Rmaile and C. B. Bucur, *J. Am. Chem. Soc.*, 2008, 130(41), 13589.
[8] G. Bantchev, Z. H. Lu, Y. Lvov, *J. Nanosci. Nanotechn.*, 2009, 9(1), 396.
[9] M. Bruening and D. Dotzauer, *Nat. Mat.*, 2009, 8(6), 449.
[10] B. G. De Geest, S. De Koker, G. B. Sukhorukov, O. Kreft, W. J. Parak, A. G. Skirtach, J. Demeester, S. C. De Smedt and W. E. Hennink, *Soft Matt.*, 2009, 5(2), 282.
[11] S. W. Lee, B. S. Kim, S. Chen, Y. Shao-Horn and P. T. Hammond, *J. Am. Chem. Soc.*, 2009, 131(2), 671.
[12] D. J. Lee and T. H. Cui, *IEEE Sensors 1*, 2009, 9(4), 449.
[13] B. Li, B. Jiang, B. Boyce, B. Lindsey, *Biomaterials*, 2009, 30, 2552.
[14] P. Podsiadlo, M. Michel, K. Critchley, S. Srivastava, M. Qin, J. W. Lee, E. Verploegen, A. J. Hart, Y. Qi and N. A. Kotov, *Angew. Chem. Inter. Ed*, 2009, 48(38), 7073.
[15] S. Facca, C. Cortez, C. Mendoza-Palomares, N. Messadeq, A. Dierich, A. P. R. Johnston, D. Mainard, J.-C. Voegel, F. Caruso and N. Benkirane-Jessel, *Proc. Natl. Acad. Sci. U.S.A.*, 2010, 107(8), 3406.

The formation of multiple nano-layers has been determined using a variety of techniques including for example but not limited to ellipsometry, UV-vis spectrometry, circular dichroism spectrometry, and a zeta potential analyzer. In this study, formation of the nano-layered solid sorbents was confirmed using energy dispersive X-ray analysis, confocal laser scanning microscopy, and ellipsometry, where an increase in PEI deposition was found with increasing PEI/PSS bilayer formation. The applied LBL nanoassembly procedure involves repetitive sequential penetration of oppositely charged polyelectrolyte solutions (i.e. PEI and PSS) in porous PMMA particles. Electrostatic attraction is believed to be the main driving force of the multiple nano-layer formation, although other forces, e.g. hydrophobic, van der Waals, and acid-base type, may also play a role in the multiple nano-layer formation.

Figure 1:
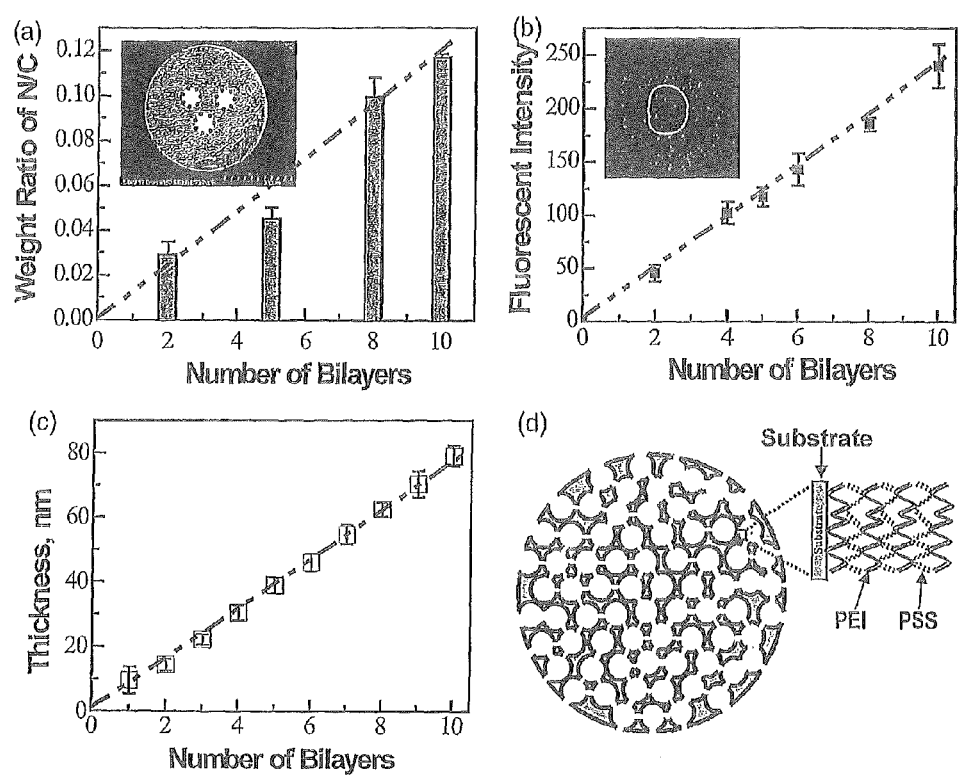
FIG. 1($a$) shows the N/C ratio vs. number of PEI/PSS bilayers inside PMMA sorbents. Inset is an SEM image and the N/C ratio data were obtained from the circled areas.
Figure 2:
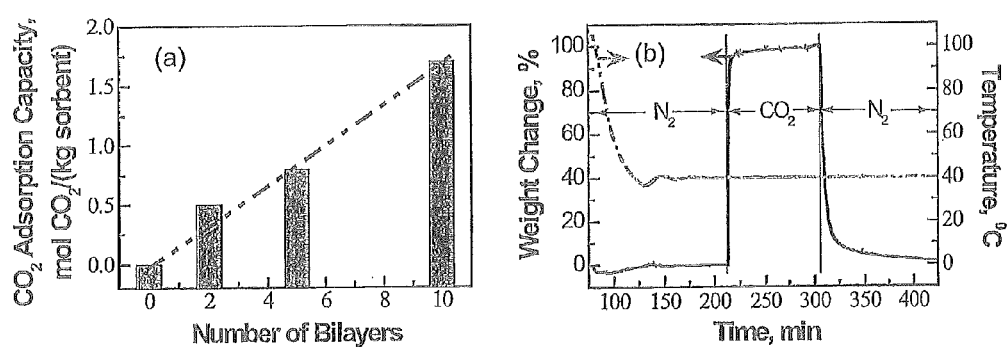
FIG. 2 (b) shows typical $CO_2$ adsorption/desorption curves of PEI/PSS nano-layered solid sorbents. Weight change set forth by the solid line, and temperature set forth by the dashed line.

The developed nano-layered solid sorbents could be used for $CO_2$ removal, and the $CO_2$ adsorption capacity was found to increase with increasing number of PEI/PSS bilayers (FIG. 2(a)). The 5- and 10-bilayered PEI/PSS sorbents had a capacity of 0.8 and 1.7 mol·$CO_2$/(kg sorbents), respectively. Replacing the strong polyeletrolyte, PSS, using a weak polyeletrolyte such as poly(acrylic acid) or PAA, however, led to low $CO_2$ adsorption capacity. The capacity of 10-bilayered PEI/PAA sorbents was 0.1 mol·$CO_2$/(kg sorbents).

Importantly, the developed solid sorbents had fast kinetics; the $CO_2$ adsorption occurred within seconds and desorption of 90% of adsorbed $CO_2$ within 30 min (FIG. 2(b)). Note that this desorption time was observed when regeneration was conducted by simply exchanging the gas atmosphere from $CO_2$ to nitrogen—i.e., a "swing" in the partial pressure of $CO_2$. Practical regeneration systems will likely include thermal swing, providing heat to increase the regeneration temperature. Raising the temperature would provide additional driving potential for $CO_2$ release from the amine adsorbent and could provide accelerated regeneration.

The mechanism of $CO_2$ capture in nano-layered solid sorbents is similar to those of amine solvents, where primary, secondary, and tertiary amines react with $CO_2$ molecules. In the presence of water, the amine groups react with gaseous $CO_2$ to form bicarbonate or carbamate. In the absence of water, the main reaction believed to account for $CO_2$ removal is carbamate formation, where ½ mole of $CO_2$ is removed for every one mole of amine:

$$CO_2 + 2R_2NH \rightleftharpoons R_2NH_2^+ + R_2NCOO^-$$

The $CO_2$ capture capacity increased with increasing PEI/PSS bilayers (FIG. 2(a)) and a capacity of 1.7 mol·$CO_2$/(kg sorbents) was obtained in the 10-bilayer sorbents; a $CO_2$ adsorption capacity of >1 mol·$CO_2$/(kg sorbents) was indicated to potentially reduce the cost of $CO_2$ sequestration. Similarly, newly developed sorbents like silica-supported tetraethylenepentamine (TEPA/$SiO_2$), polyethylene-glycol-modified TEPA/$SiO_2$, and tertiary amidine supported on activated carbon had capacities of 2.1, 1.1, and 0.8 mol·$CO_2$/(kg sorbents), respectively.

As noted earlier, one important aspect related to $CO_2$ capture technologies (e.g. solvents, sorbents, and membranes) is $CO_2$ transport kinetics. To be energy-efficient, the adsorption and desorption of $CO_2$ must be fast; current aqueous amine technologies have low adsorption/desorption rates. In general, solid sorbents have high adsorption/desorption rates due to high gas/sorbent interface area, but it could take hours to adsorb/desorb $CO_2$ where diffusion resistance is high. In this study, the alternate layering of PSS, a strong polyelectrolyte, may have facilitated the transport of $CO_2$ within the porous particles leading to fast $CO_2$ adsorption and desorption (FIG. 2(b)).

The present invention provides for the use of, LBL nanoassembly using a vacuum, to build nano-layers of $CO_2$-adsorbing polymers (e.g. PEI) within porous particles serving as sorbents for $CO_2$ removal. The alternate nano-layers of a strong polyelectrolyte (e.g. PSS) may have facilitated $CO_2$ transport within the developed solid sorbents. The formation of nano-layers of PEI and PSS was determined. We found that the N/C ratio and the fluorescent intensity of RhoB-PEI within porous PMMA particles increased almost linearly with increasing deposition of PEI/PSS bilayers. Also, the thickness of PEI/PSS bilayers and the $CO_2$ capture capacity increased with more bilayers of PEI/PSS. In addition, the nano-layered solid sorbents demonstrated the potential for rapid $CO_2$ transport kinetics. The developed solid sorbents will potentially reduce corrosion and require substantially less energy (thereby leading to cost reductions) for regeneration than current $CO_2$ scrubbing.

The present invention provides a solid sorbent comprising at least one first layer of a material that captures at least a portion of a gas, and at least one second layer of a second material that transports the gas, the second layer of material is in juxtaposition to, attached to, or crosslinked with the first layer such that the first layer of material and the second layer of material form one bilayer, and a solid substrate support having a porous surface, wherein the bilayer is deposited onto the surface of the substrate and/or is deposited into/within the solid substrate. The solid sorbent of has at least one alternating layer of the first layer of material and the second layer of material forming at least one bilayer. Preferably, the first layer of the material is different than the second layer of the material in each bilayer. More preferably, the first layer of material is a positively charged material and wherein the second layer of material is an oppositely charged material relative to the first layer of material. Most preferably, the first layer of material is a positively charged polyelectrolyte and wherein the second layer of material is a negatively charged polyelectrolyte.

In another embodiment of the present invention, the solid sorbent, as described herein, includes wherein the first layer of material is a polymer and wherein the second layer of material is a polymer. Preferably, the first layer of said material is selected from the group consisting of polyethylenimine and poly(allylamine hydrochloride), and wherein the second layer of material is selected from the group consisting of polystyrenesulfonate and poly(acrylic acid). It will be understood that the solid sorbent has a first layer that is a positively charged polymer and wherein said second layer is an oppositely charged polymer relative to the polymer of the first layer.

The solid substrate support is selected from the group consisting of polymethylmethacrylate, silica, silicone, glass, a metal, and a colloid of an inorganic and organic material. Preferably, the solid sorbent support has a porosity having an average diameter size ranging from 1 nanometer to greater than 200 nanometers.

Another embodiment of this invention provides wherein each bilayer of the solid sorbent has a thickness of at least 1 nanometer. Preferably, the solid sorbent comprises from 2 to 10 bilayers wherein each bilayer has a thickness of from 1 to 10 nanometers.

In another embodiment of this invention, the solid sorbent, as described herein, has a first layer of material that is an amine polymer. In a most preferred embodiment of this invention, the solid sorbent, as described herein, comprises a first layer of material that is polyethylenimine and a second layer of material that is polystyrenesulfonate.

Another embodiment of the present invention provides wherein the solid sorbent includes a first and a second layers of materials that are selected from the group of ionic liquid monomers and poly-ionic liquid polymers. The ionic liquid monomers are selected from the group of noncrosslinked and crosslinked monomers. In a preferred embodiment of this invention, the solid sorbent, as described herein, comprises a poly ionic liquid polymer that is formed from monomers selected from the group consisting of 2-(methacryloyloxy) ethyl-trimethylammonium chloride, p-vinylbenzonyltrimethylammonium chloride, arginine, aspartic acid, PLGA, EMIM, and combinations thereof. In a more preferred embodiment of this invention, the solid sorbent, as described herein, is a ionic liquid polymer selected from the group of poly[p-vinylbenzonyltrimethylammonium chloride][Cl], poly[p-vinylbenzonyltrimethylammonium chloride][Arg], poly[2-(methacryloyloxy)ethyltrimethylammonium chloride][Cl], [PLGA][EMIM], and [PLGA-Arginine][EMIM]. Another embodiment of this invention provides a solid sorbent, as described herein, wherein the poly ionic liquid polymer is poly[METMA][Arginine][Aspartic acid], a copolymer synthesized from polymerization of [2-(methacryloyloxy)ethyltrimethylammonium chloride][Arginine] and [2-(methacryloyloxy)ethyltrimethylammonium chloride][Aspartic acid].

In yet another embodiment of this invention, a method of preparing a solid sorbent is provided, comprising the steps of employing electrostatic layer by layer nanoassembly of drawing a positively charged polymer in aqueous media through a porous sorbent support material, as described herein, under sufficient vacuum pressure for a period of time ranging from one minute to greater than fifteen minutes for forming a positively charged layer of the positively charged polymer on the surface of and/or within the porous sorbent support material resulting in a treated porous sorbent support material, rinsing the treated porous sorbent support material with water, employing electrostatic layer by layer nanoassembly of drawing a negatively charged polymer in aqueous media through the treated porous sorbent support material under sufficient vacuum pressure for a period of time ranging from 1 minute to greater than fifteen minutes for forming a negatively charged layer of the negatively charged polymer in juxtaposition to, attached to or crosslinked with the positively charged layer resulting in the formation of one bilayer of the positively charged layer and the negatively charged layer being deposited on or within the porous solid sorbent support, and rinsing the solid sorbent support having the bilayer resulting in one cycle of deposition of the bilayer on the surface of and/or within the porous sorbent support material, and optionally repeating the above steps for forming one or more successive cycles of bilayer deposition. The method includes wherein the positively charged polymer is selected from the group consisting of polyethylenimine and poly(allylamine hydrochloride), and wherein the negatively charged polymer is selected from the group consisting of polystyrenesulfonate and poly(acrylic acid). Preferably, the method includes wherein the positively charged polymer is polyethylenimine and wherein the negatively charged polymer is polystyrenesulfonate.

In another embodiment of this invention, the method, as described herein, includes wherein the positive and the negative charged polymers are selected from the group of poly[p-vinylbenzonyltrimethylammonium chloride][Cl], poly[p-vinylbenzonyltrimethylammonium chloride][Arg], poly[2-(methacryloyloxy)ethyltrimethylammonium chloride][Cl], [PLGA][EMIM], and [PLGA-Arginine][EMIM].

Another embodiment of the method of the present invention as described herein includes wherein the positive and negatively charged polymers form a poly ionic liquid polymer selected from the group consisting of poly [METMA][Arginine][Aspartic acid], a copolymer synthesized from polymerization of [2-(methacryloyloxy)ethyltrimethylammonium chloride][Arginine] and [2-(methacryloyloxy)ethyltrimethylammonium chloride][Aspartic acid].

EXAMPLES

The following examples of preferred embodiments of the present invention set forth the performance of amine-multilayered solid sorbents for $CO_2$ removal and the effect of fabrication variables.

The emission of fossil fuel carbon dioxide ($CO_2$) to the atmosphere is implicated as the predominant cause of global climate change; therefore, advanced $CO_2$ capture technologies are of the utmost importance. In this study, innovative amine-multilayered sorbents were fabricated using layer-by-layer (LbL) nanoassembly technology via alternate deposition of a $CO_2$-adsorbing amine polymer (e.g. polyethylenimine or PEI) and an oppositely-charged polymer (e.g. polystyrene sulfonate or PSS). We found that the developed sorbents could be used for $CO_2$ capture and that LbL nanoassembly allows us to engineer their $CO_2$ capture performance through the fabrication variables (e.g. deposition polymers, deposition media, and number of bilayers). PEI/PSS was found to be the best polymer combination for developing sorbents with relatively high $CO_2$ capture capacity. The amine-multilayered solid sorbents possessed fine microstructures and may have similar polymer deposition within and on the surface of solid sorbents. These amine-multilayered sorbents had much faster $CO_2$ desorption rates compared to sorbents prepared using the current PEI-impregnation approach. Such fast $CO_2$ desorption could make sorbents a good option for $CO_2$ removal from power plants and even the atmosphere.

The present invention provides solid sorbents using layer-by-layer (LbL) nanoassembly, which is a unique technique for manufacture of composite nanofilms. LbL nanoassembly has been extensively studied to develop a variety of highly-selective and multifunctional multilayer films based on the alternate deposition of oppositely-charged polyelectrolytes on a substrate surface including metal, silicone, glass, and inorganic/organic colloid (see Decher, G., 1997, Science 277 (5330), 1232-1237, incorporated by reference herein). The attractive feature of this technology is its ability to construct multilayers at the nanometer scale and to integrate polymers of interest within a hierarchical porous architecture. Previous studies in the biomedical fields have shown that the LbL fabrication variables (e.g. polymer components, deposition medium, number of layers) have played a major role in tuning the properties of polyelectrolyte multilayer films (see Li, B., Haynie, D. T., 2004, Biomacromolecules 5(5), 1667-1670; Li, B., Haynie, D. T., Palath, N., Janisch, D., 2005, J. Nanosci. Nanotechn. 12(5), 2042-204; Li, B., Jiang, B., Boyce, B., Lindsey, B., 2009, Biomaterials 30, 2552-2558; Zhong, Y., Li, B., Haynie, D. T., 2006, Biotechnol. Prog. 22(1), 126-132; Zhao, Q., Li, B., 2008, Nanomedicine: NBM 4, 302-310; Jiang, B., DeFusco, E., Li, B., 2010, Biomacromolecules 11, 3630-3637; and Jiang, B., Li, B., 2009, Int. J. Nanomedicine 4, 37-53). The present invention investigated, for the first time, the effect of LbL fabrication variables on the properties, including $CO_2$ capture capacity, of amine-multilayered solid sorbents, and identified the best polymer combinations for nano-layered sorbents.

The following are examples of the compositions and methods of the present invention. As used in the examples, PEI is polyethylenimine (MW=10,000), PSS is polystyrene-sulfonate (MW=70,000), PAH is poly(allylamine hydrochloride) (MW=56,000), PAA is poly(acrylic acid) (MW=15,000), methanol (MeOH), ethanol (EtOH), dimethyl sulfoxide (DMSO), Rhodamine B (RhoB), and fluorescein isothiocyanate (FITC) were purchased from Sigma Aldrich Co. (St. Louis, Mo.). PEI, PSS, PAH, and PAA were each dissolved in deionized water at a concentration of 10 mg/ml. PEI in methanol and PSS in DMSO/EtOH (30/70% v/v) were also prepared at a concentration of 10 mg/ml and 1 mg/ml, respectively. In addition, PEI of 400 and 800 mg/ml were prepared in methanol. Polymethylmethacrylate (PMMA) microparticles were purchased from Supelco Co. (Bellefonte, Pa.) with the following manufacturer specifications: effective particle size 0.5 mm; pore volume 1.2 ml/g; specific surface area 470 $m^2/g$; and density 0.29 g/ml. PMMA sheets were obtained from United States Plastic Corp. (Lima, Ohio). $N_2$ and $CO_2$ of high purity were used for thermogravimetric analysis (TGA). Fluorescent labeled polymers, which could be visualized under fluorescent microscopy, were used as indicators of polymer deposition and multilayer formation. RhoB-PEI and FITC-PSS were synthesized as reported by Volodkin, D. V., Petrov, A. I., Prevot, M., Sukhorukov, G. B., 2004, Langmuir 20(8), 3398-3406, incorporated by reference herein. After stirring for 2 h at room temperature, the solutions were dialyzed against deionized water for two days and stored for further use.

Example No. 1

Preparation of PEI-Multilayered PMMA Sorbents of the Present Invention

LbL nanoassembly was used to prepare PEI-multilayered sorbents. In addition to employing the from the procedures in the LbL literature, the present invention further applied a vacuum pump to remove air and to run the solutions through the interior pores of sorbent supports (i.e. PMMA particles). Amine-multilayered sorbents were prepared at room temperature. PMMA microparticles were packed in a custom-made deposition chamber. Vacuum was applied first for 30 minutes (30 min) then the following procedures were carried out under 380 ton to prepare PEI-multilayered sorbents in aqueous media as further set forth in FIG. 5: (i) A positively-charged polymer (e.g. PEI or PAH) solution was run through PMMA microparticles for 15 min, then the microparticles were rinsed with deionized water twice for 15 min. (ii) A negatively-charged polymer (e.g. PSS or PAA) solution was run through the PMMA supports followed by two similar water rinses. The completion of these procedures, i.e. deposition of one layer of a positively-charged polymer and a second layer of a negatively-charged polymer followed by rinses, were designated as one deposition cycle or one bilayer. By repeating these deposition cycles, amine-multilayered sorbents were fabricated and were dried under vacuum at 80° C. overnight until further use. Similarly, PEI-multilayered sorbents were also prepared in organic solvents when PEI in methanol and PSS in DMSO/EtOH were used as deposition materials and methanol was used as the rinsing medium. The flow rates for all media were approximately 150 ml/min.

Preparation of PEI-Impregnated PMMA Sorbents (i.e. the Control)

PEI-impregnated PMMA sorbents were prepared using a well studied wet impregnation method (as reported in Hicks, J. C., Drese, J. H., Fauth, D. J., Gray, M. L., Qi, G. G., Jones, C. W., 2008, J. Amer. Chem. Soc. 130(10), 2902-2903; Gray, M. L., Soong, Y., Champagne, K. J., Pennline, H., Baltrus, J. P., Stevens, R. W., Khatri, R., Chuang, S. S. C., Filburn, T., 2005, Fuel Process. Techn. 86(14-15), 1449-1455; Gray, M. L., Hoffman, J. S., Hreha, D. C., Fauth, D. J., Hedges, S. W., Champagne, K. J., Pennline, H. W., 2009, Energy & Fuels 23, 4840-4844; and Khatri, R. A., Chuang, S. S. C., Soong, Y., Gray, M., 2006, Energy & Fuels 20, 1514-1520, incorporated by reference herein). This method comprised dissolving PEI in methanol at a concentration of 400 or 800 mg/ml under a rotary evaporator (RV 10 basic plus D, Wilmington, N.C.) using a stirring rate of 100 rpm. After 15 min, PMMA microparticles (i.e sorbent support material) were added. The suspension was continuously stirred for about 30 min under a manual water pump (450 ton vacuum) and subsequently dried at 60° C. (degrees Centigrade) for 2 h (hours).

Characterization

PMMA sorbents were examined using confocal laser scanning microscopy (CLSM, Zeiss 510 Meta Confocal Microscope, Thornwood, N.Y.), scanning electron microscopy (SEM, Hitachi S-4700, Tokyo, Japan), ellipsometry (M-2000, J. A. Woollam., Lincoln, Nebr.), and TGA (Perkin Elmer, Waltham, Mass.). PMMA sorbents were cut into halves. Images of the cross-sections of RhoB-PEI and FITC-PSS deposited PMMA sorbents were also taken in a z-stack mode to visualize the distribution of the two polymers. In addition, PMMA microparticles, cutting into halves or intact, were glued onto stainless steel supports and sputtered with gold. SEM and energy dispersive X-ray (EDX) analysis were conducted on the surfaces of whole (intact) and on the cross-sections of broken PMMA sorbents. The value of N/C ratio was averaged from five randomly selected samples. To estimate the thickness of each bilayer, polymer multilayers were formed on planar PMMA sheets under similar deposition conditions as they were deposited in PMMA microparticles and ellipsometry measurements were conducted.

The $CO_2$ capture performance of amine-multilayered PMMA sorbents was determined using TGA (see Gray, M. L., Hoffman, J. S., Hreha, D. C., Fauth, D. J., Hedges, S. W., Champagne, K. J., Pennline, H. W., 2009, Energy & Fuels 23, 4840-4844, incorporated by reference herein) and compared to one of the most commonly studied solid sorbents, i.e. PEI-impregnated PMMA sorbents (see Hicks, J. C., Drese, J. H., Fauth, D. J., Gray, M. L., Qi, G. G., Jones, C. W., 2008, J. Amer. Chem. Soc. 130(10), 2902-2903; Gray, M. L., Soong, Y., Champagne, K. J., Pennline, H., Baltrus, J. P., Stevens, R. W., Khatri, R., Chuang, S. S. C., Filburn, T., 2005, Fuel Process. Techn. 86(14-15), 1449-1455; Gray, M. L., Hoffman, J. S., Hreha, D. C., Fauth, D. J., Hedges, S. W., Champagne, K. J., Pennline, H. W., 2009, Energy & Fuels 23, 4840-4844; and Khatri, R. A., Chuang, S. S. C., Soong, Y., Gray, M., 2006, Energy & Fuels 20, 1514-1520). Approximately 50 mg of PMMA-based sorbent was loaded in the TGA microbalance quartz sample cell. The sample was heated at 105° C. in $N_2$ atmosphere for about 60 min, and the temperature was then lowered to 40° C. The adsorption cycle was carried out at 40° C. under pure dry $CO_2$ until no obvious weight gain was observed. A desorption cycle was subsequently performed at 40° C. using a pressure-swing approach by means of introducing pure $N_2$ into the sample cell. All gas flow rates were set at 200 ml/min. The weight change in milligrams (mg) of the PMMA particles was recorded and the weight change in percentage was defined as the ratio of the amount of the gas evolved, adsorbed or desorbed over the total amount of $CO_2$ adsorbed. Adsorption capacity in mol·$CO_2$/(kg sorbent) was calculated from the weight change of the samples during the adsorption and desorption cycles. In addition, adsorption capacity in mol·$CO_2$/(kg PEI) was estimated, assuming equal amounts of positively- and negatively-charged polymers were deposited in the PMMA sorbents.

Figure 5:
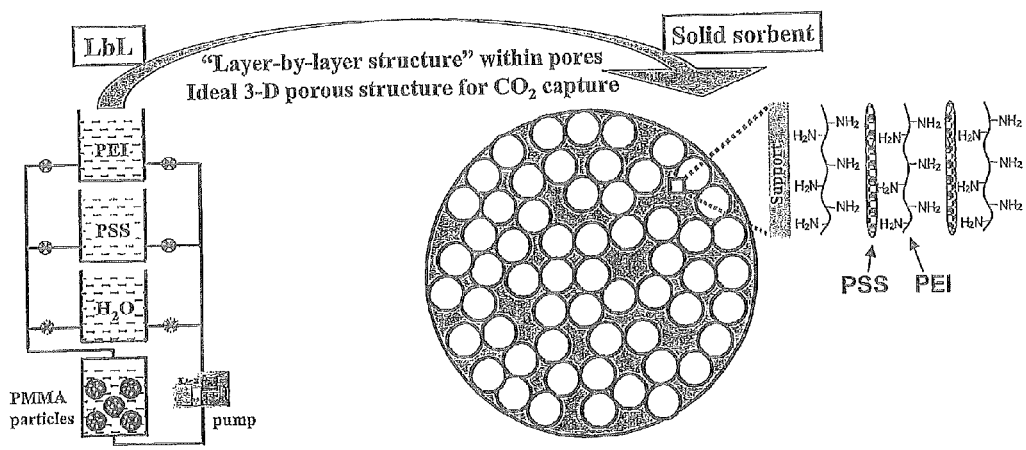
FIG. 5 shows a schematic representation of the preparation of amine-multilayered solid sorbents using a Lbl nanoassembly procedure as described herein.
Figure 6:
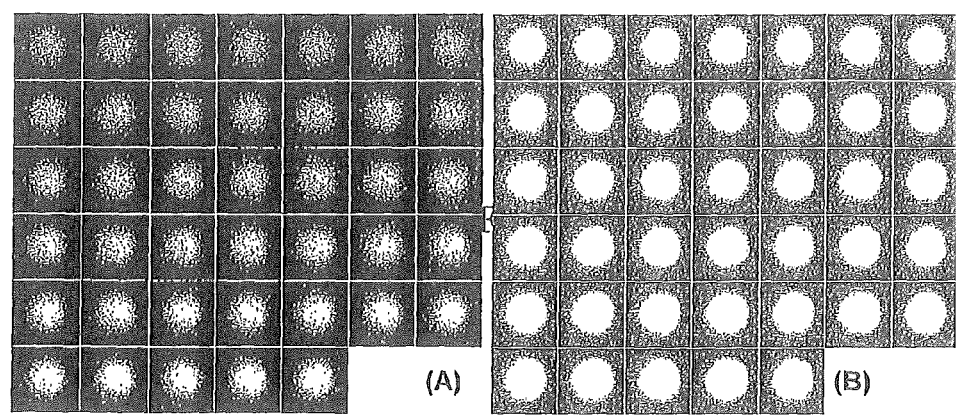
FIG. 6 shows Z-stack images (distributions of PEI—FIG. 6(A) and PSS—FIG. 6(B)) visualized under CLSM with excitation/emission wavelengths of (A) 543/580 nm and (B) 488/525 nm of Rhodamine B-labeled PEI (RhoB-PEI) and fluorescein isothiocyanate-labeled PSS (FITC-PSS) deposited (PEI/PSS)$_{10}$ multilayered PMMA beads. Interval thickness of each slice is 0.9 μm, Z-stack size is 113 μm.
Figure 7:
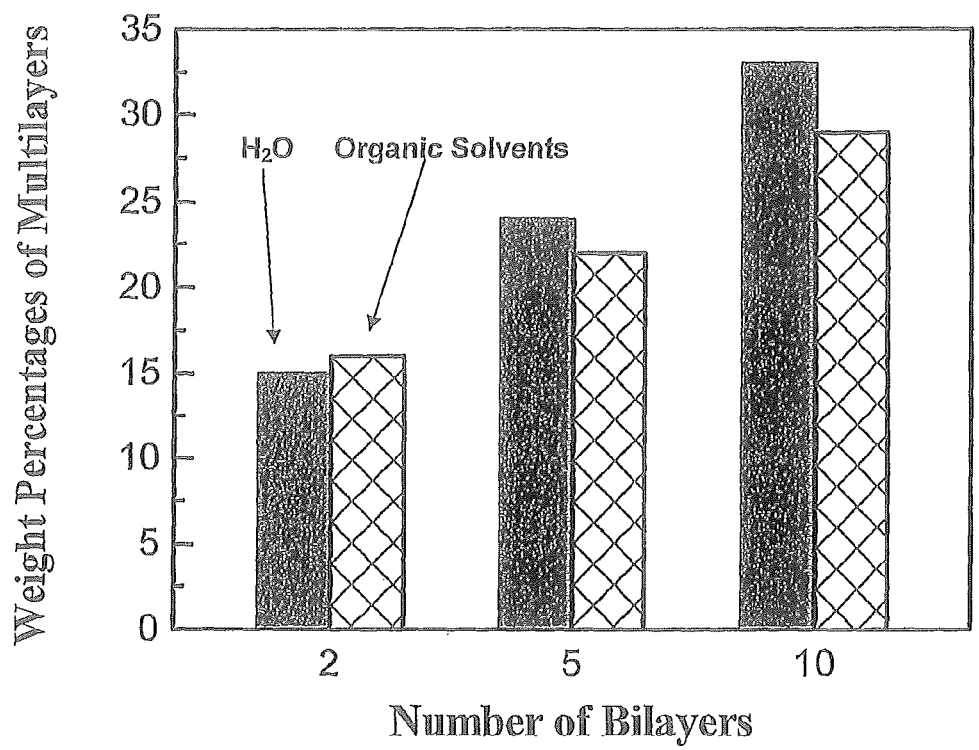
FIG. 7 shows the weight percentage of PEI/PSS multilayers in PMMA substrate.
Figure 9:
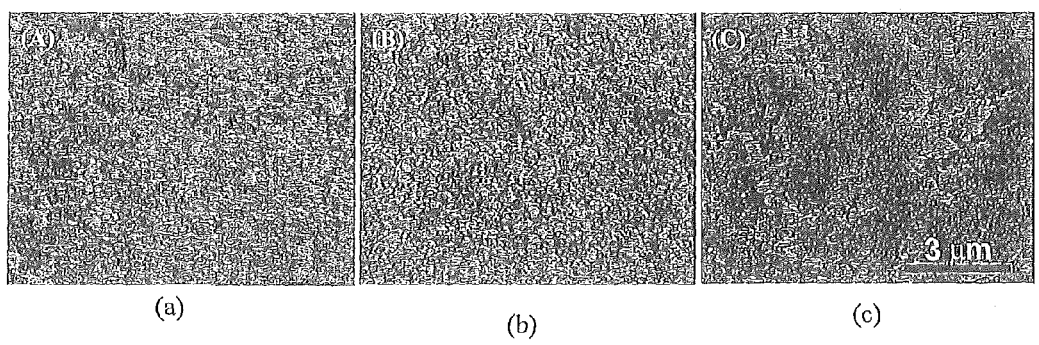
FIG. 9 shows the interior porous structures of (a) [(PEI/PSS) 5 bilayers] PMMA; (b) [(PEI/PSS) 10 bilayers] PMMA; and (c) PEI-impregnated PMMA. The FIGS. 9(a), 9(b), and 9(c) all share the same scale bar.

Polyethylenimine/polystyrene sulfonate (PEI/PSS) multilayered solid sorbents of the present invention were prepared using LbL nanoassembly (see FIG. 5). The distribution of PEI and PSS within PMMA particles was examined using CLSM. Both PEI and PSS were confirmed to be deposited uniformly throughout the (PEI/PSS)$_{10}$ multilayered PMMA particles (see FIG. 6). Note that the subscript refers to the number of bilayers or deposition cycles. More polymers (i.e. PEI and PSS) were deposited with an increasing number of PEI/PSS bilayers (see FIG. 7). Moreover, the nitrogen/carbon (N/C) ratio increased with increasing PEI/PSS bilayers and the N/C ratios on the PMMA particle surfaces and within the multilayered PMMA particles were found to be approximately the same in the (PEI/PSS)$_{10}$ multilayered PMMA samples; however, a substantially higher (68% more) N/C ratio was detected on surfaces of the PEI-impregnated PMMA particles compared to those of their interior surfaces (See FIG. 8)). In addition, the PEI/PSS multilayered PMMA sorbents had very fine porous structures while the PEI-impregnated PMMA sorbents were much less porous (see FIG. 9).

The fabrication variables (e.g. deposition cycle, polymer component, and deposition medium) of the LbL nanoassembly process influenced the $CO_2$ capture capacity of the developed solid sorbents (see data of FIG. 3). The (PEI/PSS)$_{10}$ PMMA, prepared in water media almost doubled the capacity, in mol·$CO_2$/(kg sorbent), of (PEI/PSS)$_5$ PMMA, and had slightly higher capacity compared to (PEI/PSS)$_{10}$ PMMA prepared in organic solvents, wherein the subscripts "5" and "10" refer to the number of bilayers, respectively. Replacing PSS with a weak polyelectrolyte (i.e. PAA) or replacing PEI with PAH led to a substantial decrease in $CO_2$ capture capacity. For instance, the capacity decreased from 1.7 mol·$CO_2$/(kg sorbent) of (PEI/PSS)$_{10}$ PMMA to a little adsorption, i.e. 0.1 mol·$CO_2$/(kg sorbent), of (PEI/PAA)$_{10}$ PMMA. Moreover, the PEI/PSS multilayered sorbents had high amine efficiency, i.e. the $CO_2$/N ratio, up to 0.77 mol·$CO_2$/mol·N for the (PEI/PSS)$_{10}$ PMMA sorbents. In addition, the deposition medium may have also influenced the thickness of PEI/PSS multilayers, as the thickness (~10 nm/bilayer) of PEI/PSS deposited in organic solvents was slightly higher than that (~8 nm/bilayer) of PEI/PSS deposited in water media (see FIG. 10).

Figure 11:
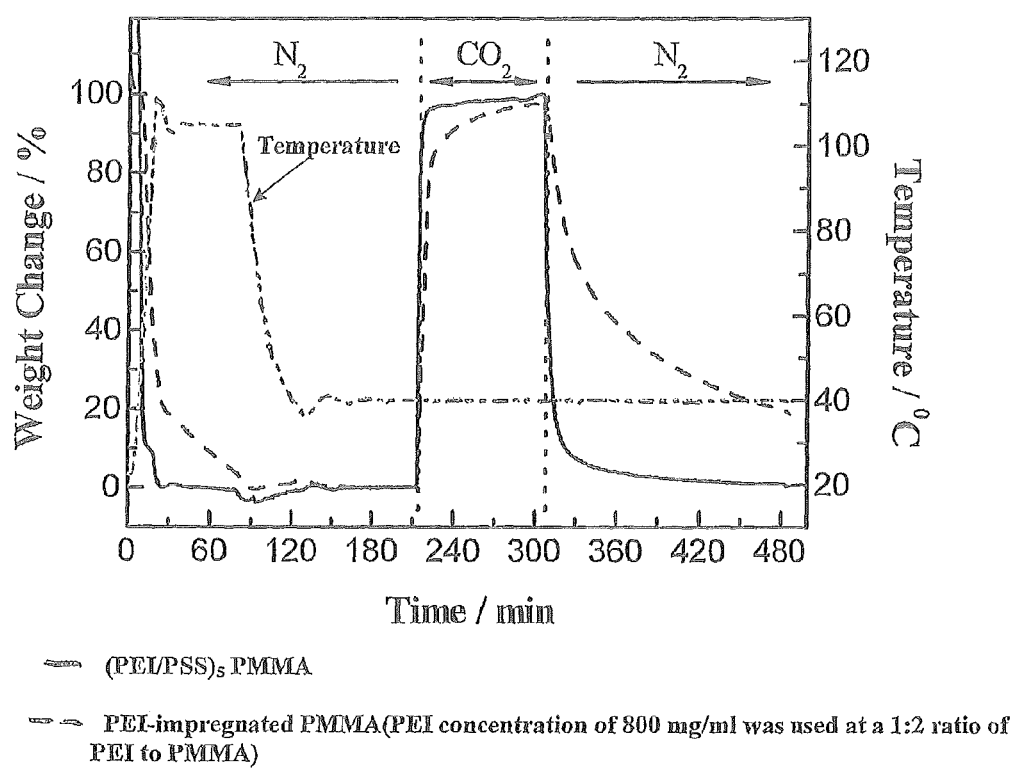
FIG. 11 shows the adsorption capacity of PEI/PSS multilayered and PEI-impregnated sorbents under pure $CO_2$ atmosphere. Samples of the same $CO_2$ capture capacity, i.e. 0.8 mol·$CO_2$/(kg sorbent). (PEI/PSS)$_5$ PMMA, PEI-impregnated PMMA (PEI concentration of 800 mg/ml was used at a 1:2 ratio of PEI to PMMA).
Figure 12:
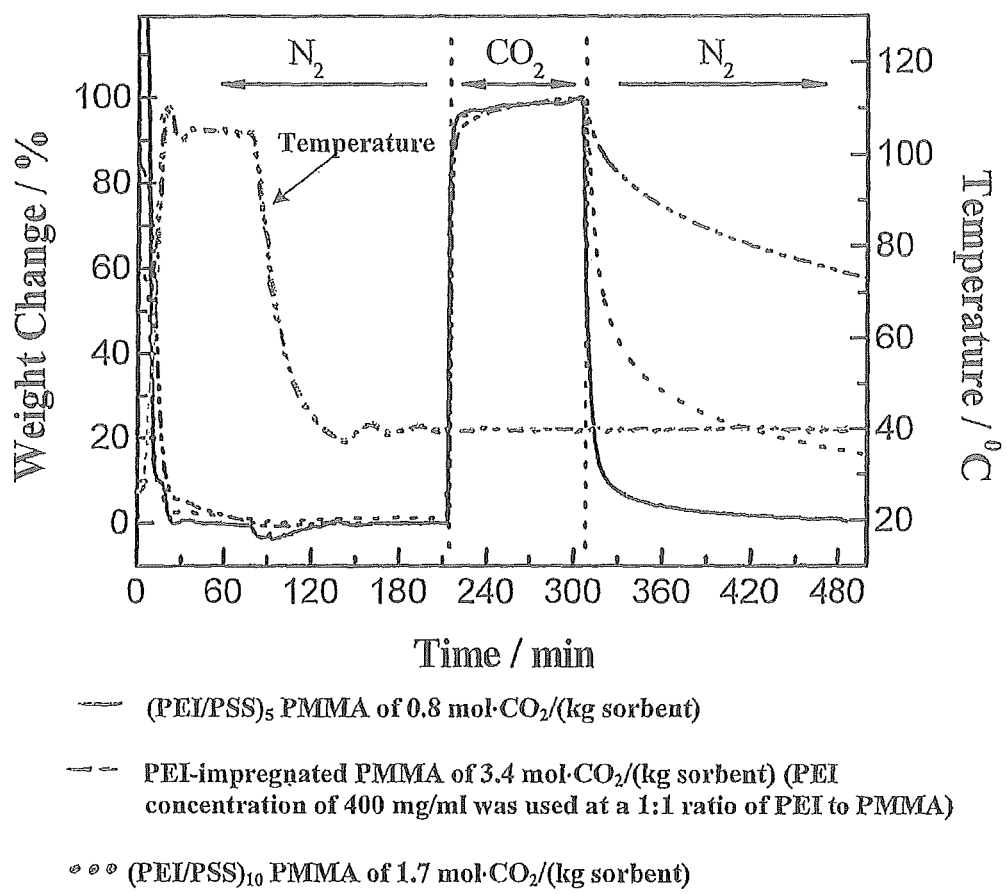
FIG. 12 shows the adsorption capacity of PEI/PSS multilayered and PEI-impregnated sorbents under pure $CO_2$ atmosphere. Samples of different $CO_2$ capture capacity, 0.8, 1.7 and 3.4 mol·$CO_2$/(kg sorbent). (PEI/PSS)$_5$ PMMA of 0.8 mol·$CO_2$/(kg sorbent), (PEI/PSS)$_{10}$ PMMA of 1.7 mol·$CO_2$/(kg sorbent), PEI-impregnated PMMA of 3.4 mol·$CO_2$/(kg sorbent) (PEI concentration of 400 mg/ml was used at a 1:1 ratio of PEI to PMMA).

Compared to the control group of the PEI-impregnated PMMA sorbents, PEI/PSS multilayered solid sorbents of the present invention showed substantially faster $CO_2$ desorption rates during sorbent regeneration and relatively faster $CO_2$ adsorption rates during adsorption cycles (FIG. 11). At the same capacity, e.g. 0.8 mol·$CO_2$/(kg sorbent), the desorption of $CO_2$ from PEI/PSS multilayered sorbents was much faster (3 minutes vs. 36 minutes for 50% desorption) than from PEI-impregnated PMMA sorbents (see data of FIG. 4). It may take hours at a minimum to desorb $CO_2$ from PEI-impregnated PMMA sorbents. It was found that within 30 minutes, more $CO_2$ was desorbed from PEI/PSS multilayered sorbents than from PEI-impregnated PMMA sorbents (see FIG. 4). Increasing PEI/PSS bilayers from 5 to 10 significantly improved the desorption of $CO_2$ at a given time period (e.g. 30 minutes). Interestingly, two- or three-fold $CO_2$ was desorbed within 30 minutes from (PEI/PSS)$_5$ and (PEI/PSS)$_{10}$ PMMA sorbents than from PEI-impregnated PMMA sorbents which had a several-fold higher capacity of 3.4 mol·$CO_2$/(kg sorbent) (FIG. 12).

Carbon dioxide is one of the major greenhouse gases directly influencing global climate change because of its effect on the earth's ozone layer; its emission may have contributed to urban smog, acid rain and health problems. Those persons skilled in the art understand that the present invention provides innovative amine-multilayered solid sorbents using nanotechnology, namely LbL (layer by layer) nanoassembly along with vacuum means, as described herein. PEI (a $CO_2$-adsorbing polymer) and PSS, positively-charged and negatively-charged polymers, respectively, were finely deposited in the porous structure of PMMA microparticles (see FIGS. 6(a), 6(b), 9(a), and 9(b)). It was found that the fabrication variables significantly influenced the properties of the developed multilayered solid sorbents. Substantially higher $CO_2$ capture capacity was obtained for (PEI/PSS)$_{10}$ PMMA sorbents than (PEI/PAA)$_{10}$ and (PAH/PSS)$_{10}$ PMMA sorbents, wherein the subscripts "10" refer to the number of bilayers. This may indicate that the alternate layers of a strong polyelectrolyte (i.e. PSS) compared to a weak one (i.e. PAA) could substantially enhance the accessibility and deposition of the CO$_2$-adsorbing polymer (i.e. PEI) thereby leading to higher CO$_2$ capture capacity (see FIG. 3). The number of PEI/PSS bilayers as well as the deposition medium influenced the PEI/PSS multilayer structure and thereby the CO$_2$ capture capacity. With an increasing number of PEI/PSS bilayers, more polymers (PEI and PSS) were deposited into the PMMA particles (FIG. 7) and, as a result, the thickness of the PEI/PSS bilayer (see FIG. 10) and the N/C ratio increased (see FIG. 8). Consequently, the CO$_2$ capture capacity was almost doubled when the PEI/PSS bilayers were doubled from 5 to 10 (see FIG. 3). In addition, the improved distribution or deposition of polymers inside and outside the PMMA microparticles (see FIG. 8) may have improved the accessibility of the CO$_2$-adsorbing polymer (i.e. PEI). Further tuning of the multilayer structure (e.g. uniformity of the layers) thereby sorbent properties may be achieved via salt (e.g. NaCl) and polymer concentrations as well as co-mixtures of polymers, use of solvent, and application of vacuum or pressure.

Under dry conditions, the maximum amine efficiency of an amine adsorbent is 0.5 mol·CO$_2$/mol·N, however, higher amine efficiency was also reported by Harlick, P. J. E., Sayari, A., 2007, Ind. Eng. Chem. Res. 46, 446-458; Sema-Guerrero, R., Da'na, E., Sayari, A., 2008, Ind. Eng. Chem. Res. 47, 9406-9412; and Choi, S., Drese, J. H., Jones, C. W., 2009, ChemSusChem 2(9), 796-854. The amine efficiency of amine adsorbents reported in these literature sources under dry conditions varied within a wide range from 0.025 to 0.89, and it was suggested that physisorption of CO$_2$ besides chemisorption by amines contributed to the total capacities (see Choi, S., Drese, J. H., Jones, C. W., 2009, ChemSusChem 2(9), 796-854; and Sema-Guerrero, R., Da'na, E., Sayari, A., 2008, Ind. Eng. Chem. Res. 47, 9406-9412). In the present invention, the amine efficiency of PEI/PSS multilayered sorbents varied from 0.56 to 0.77 mol·CO$_2$/mol·N, and similarly, physisorption of CO$_2$ contributed partially to the CO$_2$ capture capacity.

One major motivation for developing solid sorbents is that they may require substantially less energy for regeneration than current aqueous amine CO$_2$ scrubbing (Hoffman, J., Richards, G. A., Pennline, H. W., Fischer, D., Keller, G., 2008. Proceedings of the 33$^{rd}$ International Technical Conference on Coal Utilization and Fuel Systems, Clearwater Fla., Jun. 1-5, 2008, paper 120. Coal Technology Association, Gaithersburg Md., ISBN 978-0-932066-336, and Li, W., Choi, S., Drese, J. H., Hombostel, M., Krishnan, G., Eisenberger, P. M., Jones, C. W., 2010. ChemSusChem 3, 899-903). One challenge of most solid sorbents still lies in the slow CO$_2$ desorption rate; it may take hours or days for the desorption process where diffusion resistance is high (Satyapal, S., Filburn, T., Trela, J., Strange, J., 2001. Energy & Fuels 15(2), 250-255). The present invention provides in a preferred embodiment, PEI/PSS multilayered solid sorbents, for CO$_2$ adsorption and desorption, since PEI/PSS multilayered PMMA sorbents showed very fine distribution of PEI within the PMMA particles (see FIG. 9) and fast CO$_2$ adsorption and desorption rates (see FIGS. 11 and 12). Compared to one of the most well studied solid sorbents (i.e. PEI-impregnated PMMA sorbents, see Gray, M. L., Soong, Y., Champagne, K. J., Pennline, H., Baltrus, J. P., Stevens, R. W., Khatri, R., Chuang, S. S. C., Filburn, T., 2005. Fuel Process. Techn. 86(14-15), 1449-1455; and Gray, M. L., Hoffman, J. S., Hreha, D. C., Fauth, D. J., Hedges, S. W., Champagne, K. J., Pennline, H. W., 2009. Energy & Fuels 23, 4840-4844; Hicks, J. C., Drese, J. H., Fauth, D. J., Gray, M. L., Qi, G. G., Jones, C. W., 2008. J. Amer. Chem. Soc. 130(10), 2902-2903; and Khatri, R. A., Chuang, S. S. C., Soong, Y., Gray, M., 2006. Energy & Fuels 20, 1514-1520), the PEI/PSS multilayered solid sorbents of the present invention had a much faster CO$_2$ desorption rate (see data of FIG. 4). Within a reasonably short time period (i.e. 30 min), twice or three times the CO$_2$ was desorbed from amine-multilayered solid sorbents compared to the PEI-impregnated sorbents, even though the latter had much higher CO$_2$ capture capacity. The enhancement of amine-multilayered solid sorbents in CO$_2$ desorption rate possibly was due to the unique nano-layered and fine microstructure, which may facilitate CO$_2$ transport, of the PEI/PSS multilayered sorbents versus the densely-packed microstructure of the PEI-impregnated sorbents (see FIG. 9). Multilayer coatings prepared by LbL nanoassembly have shown hierarchical nanofilm architectures with nano-scale pores (Mendelsohn, J. D., Barrett, C. J., Chan, V. V., Pal, A. J., Mayes, A. M., Rubner, M. F., 2000. Langmuir 16, 5017-5023), which could be especially suitable for substance (e.g. CO$_2$) transport. Another possible reason for the fast desorption rate is that the heat of adsorption over the LbL assembled PEI could be much lower than that of the PEI-impregnated sorbents. The PEI amine sites in the multilayered sorbents are partially neutralized by PSS thereby these sites may bind acidic CO$_2$ more weakly than uncomplexed PEI. In addition, the uniform distribution or deposition of polymers inside and outside the PMMA microparticles (see FIG. 8) may have also facilitated CO$_2$ transport during its adsorption and desorption processes. Therefore, PEI/PSS multilayered PMMA sorbents had fast adsorption and desorption rates (supporting data shown in FIGS. 4, 11, and 12). Note that pressure swing was applied in this study and practical regeneration systems will likely include thermal swing which will provide additional heat for regeneration. As a result, faster desorption rate is expected in combination of pressure swing and thermal swing.

Thus, those persons skilled in the art will appreciate that the present invention utilizes LbL nanoassembly along with applying a vacuum and/or pressure to fabricate amine-multilayered solid sorbents for CO$_2$ removal. The LbL fabrication variables including polymer components and deposition cycles were used to optimize the CO$_2$ capture properties of amine-multilayered solid sorbents. Compared to less preferred embodiments of the present invention, namely the multilayered solid sorbents of (PEI/PAA)$_{10}$ and (PAH/PSS)$_{10}$, the more preferred (PEI/PSS)$_{10}$ multilayered sorbents of the present invention showed the highest CO$_2$ capture capacity. More polymers were deposited with increasing deposition cycles. Also, the deposition medium was found to influence the multilayer thickness. Most importantly, the developed amine-multilayered solid sorbents had fine microstructures and fast CO$_2$ desorption rates. The multilayered solid sorbents of the present invention may be used in, for example but not limited to, flue-gas stream (e.g. 10% CO$_2$/H$_2$O/90% He), in one or multiple cycles.

Example No. 2

Figure 13:
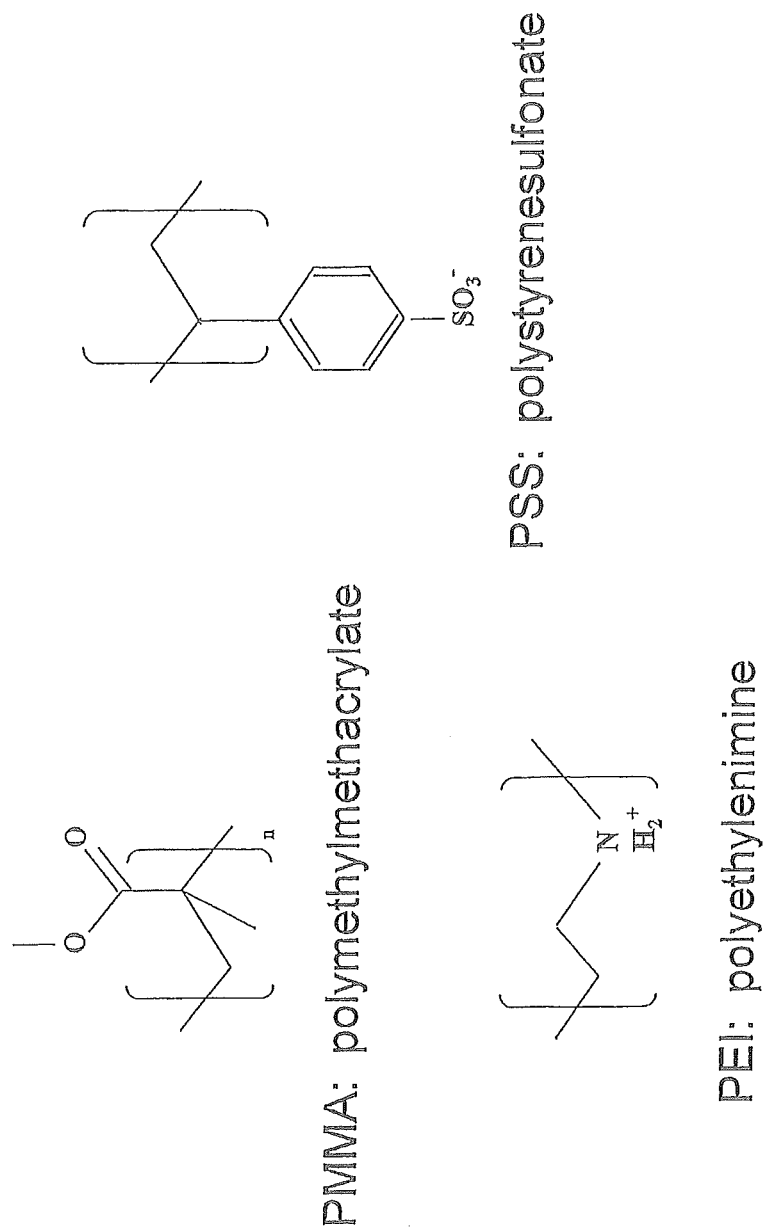
FIG. 13 shows the chemical structures of the polymers of the preferred sorbents PEI and PSS of the present invention and the structure of a support material, PMMA.

The chemical structures of PEI, polystyrene sulfonate (PSS), and polymethylmethacrylate (PMMA) are shown in FIG. 13. PEI (M$_n$=10,000) and PSS (M$_n$=70,000) were purchased from Sigma Aldrich Co. (St. Louis, Mo.) and individually dissolved in deionized water at a concentration of 10 mg/ml. Porous support, PMMA particles (HP-2MG), was obtained from Sigma Aldrich Co. with the following manufacturer specifications: effective particle size ~0.5 mm, pore volume ~1.2 ml/g, specific surface area ~470 m$_2$/g, and density ~0.29 g/ml. N$_2$ and CO$_2$ of high purity (>99%) were used. The PMMA sheet was purchased from United States Plastic Corp. (Lima, Ohio). Rhodamine B labeled PEI (RhoB-PEI) was synthesized by mixing the solutions in 50 mM phosphate buffer solution at a molar ratio of 1:100 of PEI to rhodamine B, stirring for 2 h at room temperature, and dialyzing in deionized water using a cellulose dialysis sack with a cutoff of 10 kDa for 2 days.

Preparation of PEI/PSS Nano-Layered Solid Sorbents

Figure 14:
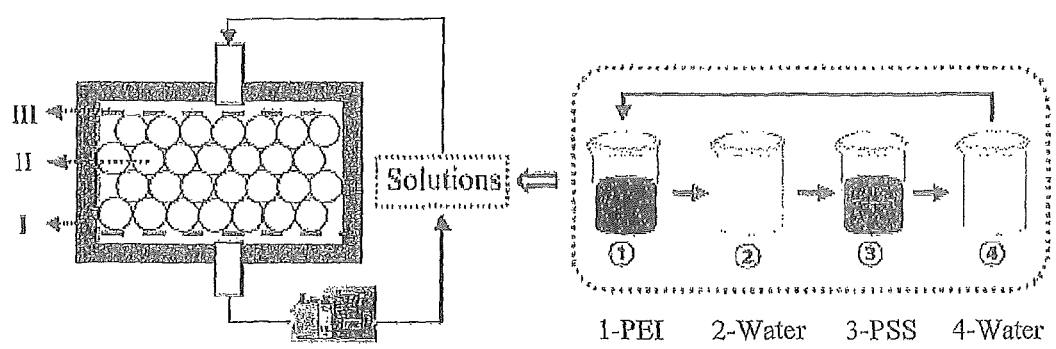
FIG. 14 shows a schematic representation of the formation of nano-layered solid sorbents. Solutions 1, 2, 3, and 4 penetrated through the sorbent substrates, alternately. A vacuum pump (representation of which is depicted on the very bottom of the schematic) was used to facilitate the running of the solutions through the sorbent substrates.

To facilitate the deposition of PEI/PSS multilayers within porous particles, a setup (see FIG. 14) was built where a vacuum pump was used to remove air and permit driving the deposition solutions into the porous evacuated particles. The deposition process included repeated penetration of PEI, water, PSS, and water solutions under vacuum (380 ton). In brief, vacuum was applied to PMMA particles for 30 min. The PEI solution was run through the particles for 15 min followed by vacuum and water washing twice for 15 min each time. After vacuum, the PSS solution was then passed through the particles for 15 mM and rinsed with water twice. This process led to the deposition of PEI and PSS, which was designated as one bilayer of PEI/PSS.

Repeating this process resulted in the deposition of desirable numbers of PEI/PSS bilayers in the PMMA particles. Finally, sorbents were dried under vacuum at 80 degrees Centigrade overnight and stored until further use. RhoB-PEI, instead of PEI, and PSS were also deposited in PMMA particles for fluorescent examination.

Characterization of PEI/PSS Nano-Layered Solid Sorbents

The morphology and nitrogen/carbon (N/C) ratio of the inner surfaces of PMMA particles were examined using scanning electron microscopy (SEM) and energy dispersive X-ray (EDX) analysis. PMMA particles were cut into half using a thin, sharp blade under optical microscopy. Samples were mounted on stainless steel supports and sputtered with gold, and the sample cross-sections were examined. A Hitachi S-4700 field emission scanning electron microscope was operated at 5.0 keV. Samples with different bilayers of PEI/PSS were studied and their N/C ratio vs. PEI/PSS bilayers was obtained. The data of five randomly selected particles were averaged. The cross-sections of PMMA particles, deposited with RhoB-PEI and PSS, were also examined under confocal laser scanning microscopy (CLSM). In addition, PEI/PSS bilayers were also deposited on a planar PMMA sheet substrate under similar deposition conditions and the thickness was determined using ellipsometry (M-2000, J. A. Woollam, Lincoln, Nebr.).

CO$_2$ Capture Properties of PEI/PSS Nano-Layered Solid Sorbents

The adsorption and desorption performance of nano-layered solid sorbents was determined using thermogravimetric analysis (TGA). The weight gain and loss from the sorbent particles were recorded, and the weight change in percentage was defined as the ratio of the amount of the gas adsorbed or desorbed over the total amount of gas adsorbed. In a typical adsorption/desorption process, 50 mg of the nano-layered PMMA particles was placed in the microbalance quartz sample cell, heated to 105° C. in N$_2$ atmosphere at a flow of 200 ml/min (milliliter/minute), and kept at that temperature for about 60 minutes until no weight loss was observed. The temperature was then adjusted to 40° C. and 100% dry CO$_2$ was introduced at a flow rate of 200 ml/min. After adsorption, the gas was switched to pure N$_2$ at a flow rate of 200 ml/min to perform CO$_2$ desorption. Adsorption capacity in mol·CO$_2$/(kg sorbent) was calculated from the weight change of the samples during the adsorption/desorption process.

Effect of Water on the Stability of PEI/PSS Nano-Layered Sorbents

Figure 15:
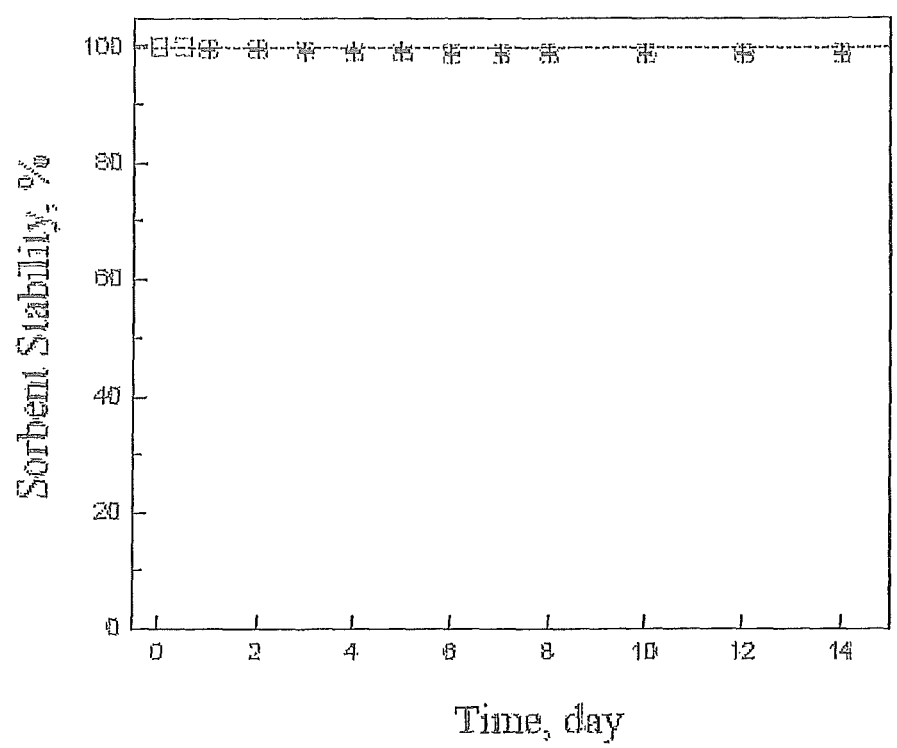
FIG. 15 shows that the PEI/PSS sorbents were 100 percent stable in water.
Figure 17:
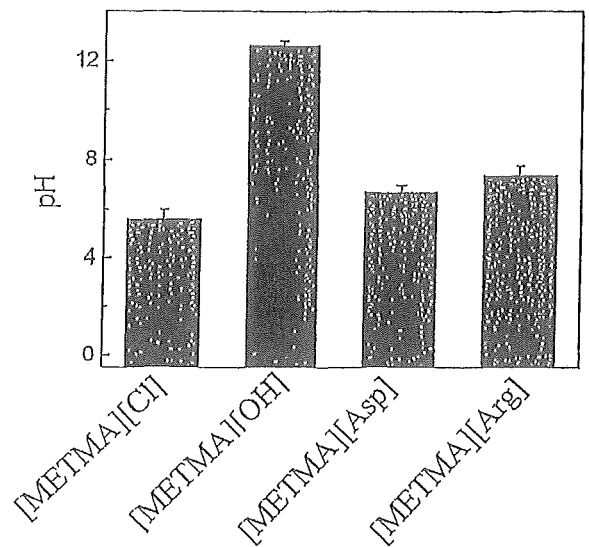
FIG. 17 shows the pH change in the synthesis process of ionic liquid (IL) monomers.
Figure 18:
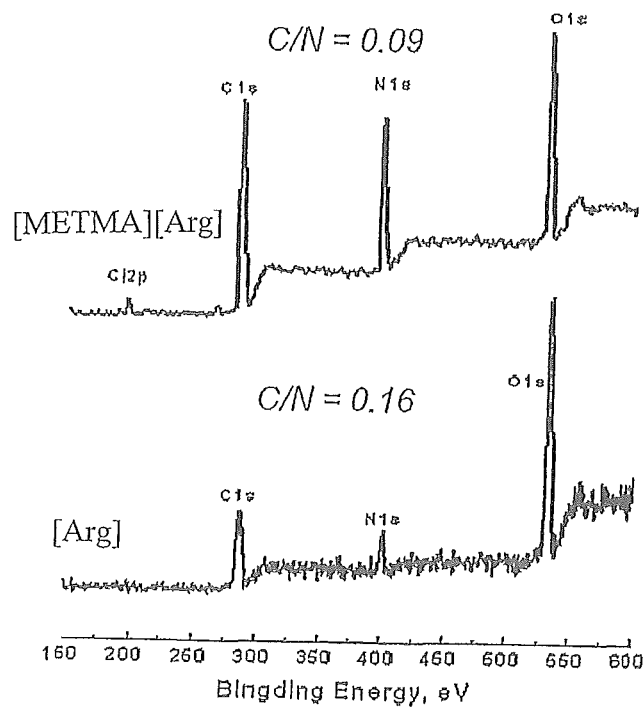
FIG. 18 shows the XPS analyses and the C/N ratio of Arg (Arginine) and [METMA][Arg].
Figure 19:
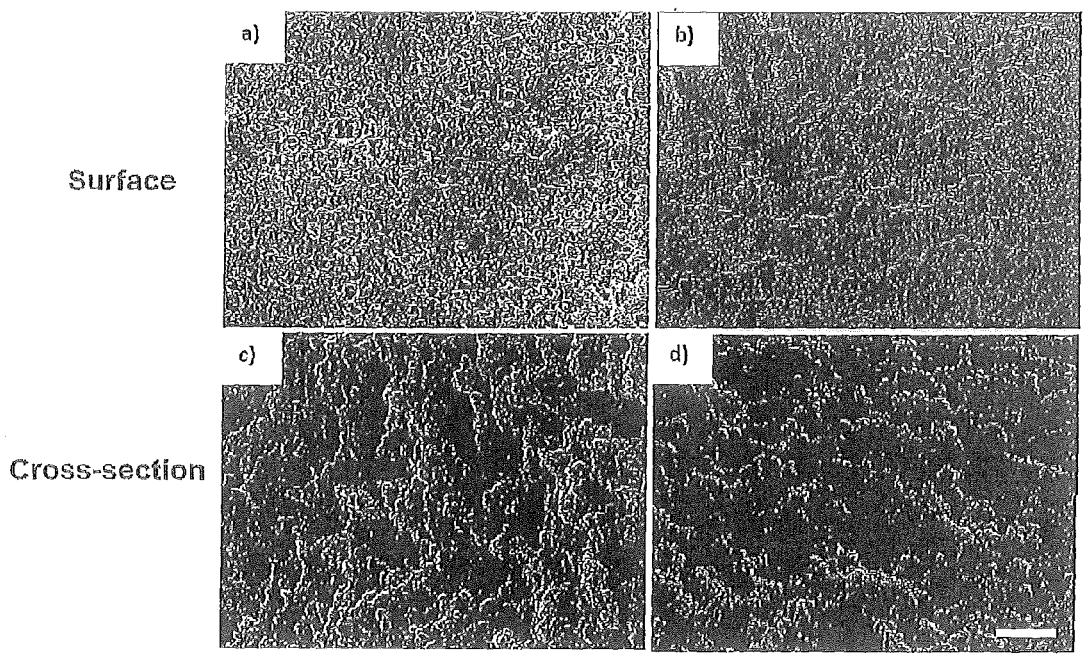
FIG. 19 shows the SEM images of amino acid IL impregnated PMMA sorbents of the present invention.
Figure 20:
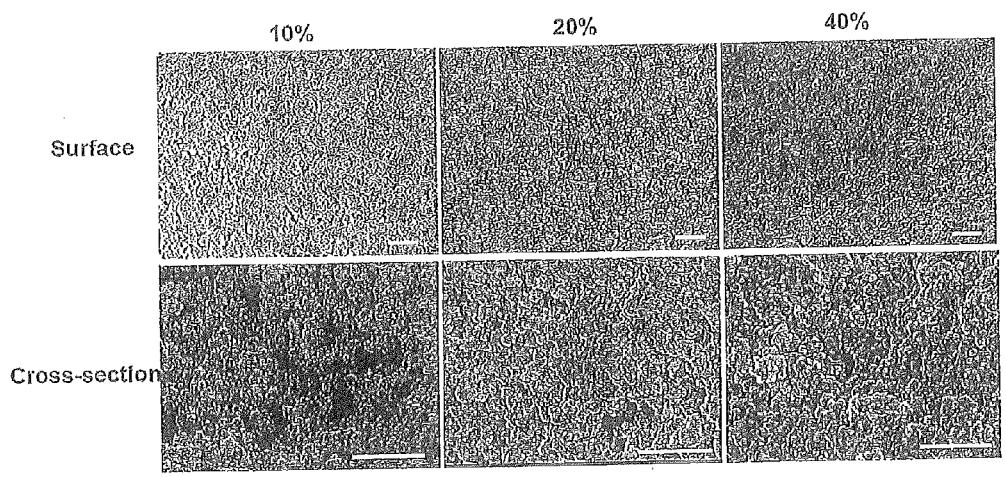
FIG. 20 shows SEMs of amino acid IL impregnated MAA sorbents of the present invention, with the top row=surface, and bottom row=cross-section.
Figure 21:
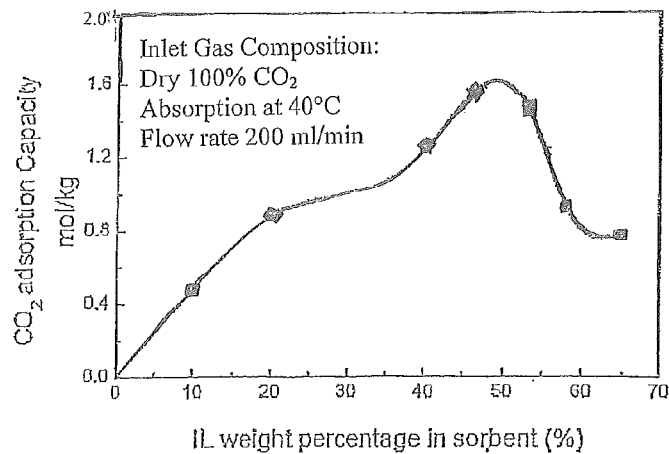
FIG. 21(a) shows the $CO_2$ adsorption capacity of IL impregnated PMMA sorbent effects of polymerization.
FIG. 21(b) shows the effect of crosslinking on $CO_2$ adsorption capacity.
FIG. 21(c) shows the ionic liquid weight percentage in sorbent upon the $CO_2$ adsorption capacity.
FIG. 21(d) shows the effect of amino acid weight percent content in sorbent upon the $CO_2$ capacity and amino acid efficiency.
FIG. 21(e) shows the $CO_2$ adsorption capacity of ionic liquid (IL)-impregnated in different sorbents, namely PMMA and Q10.
Figure 22:
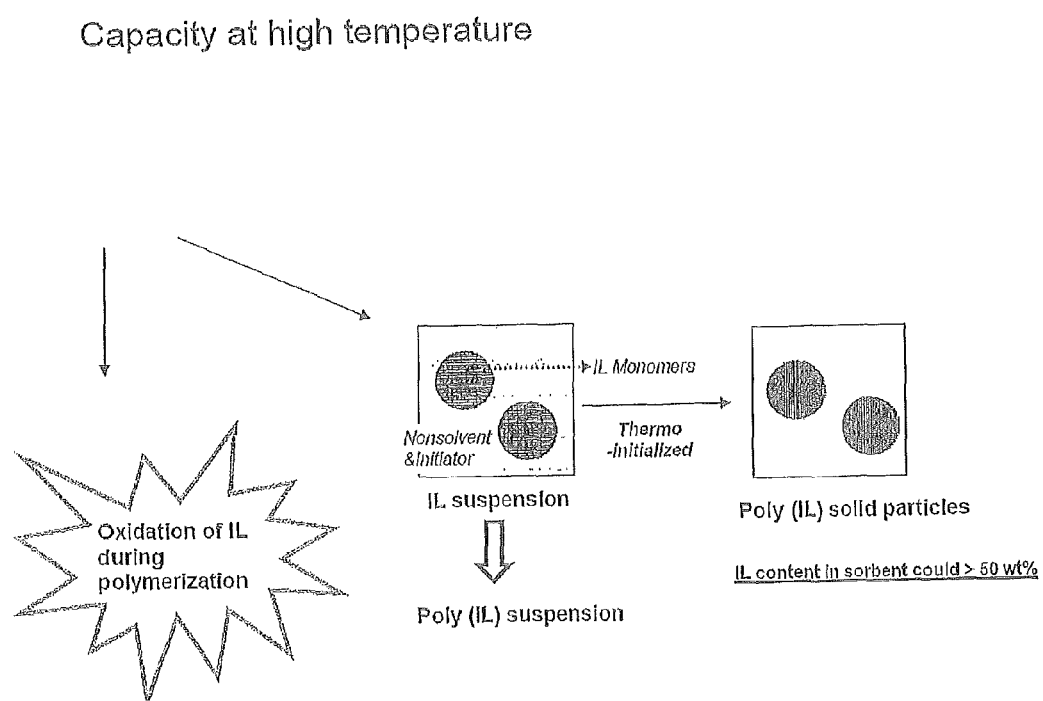
FIG. 22 shows that the poly(IL)s of the present invention may be made as a suspension and that the IL monomers may be thermo-initialized to produce poly(IL) solid particles wherein the ionic liquid content in sorbent is preferably greater than 60 weight percent.
Figure 24:
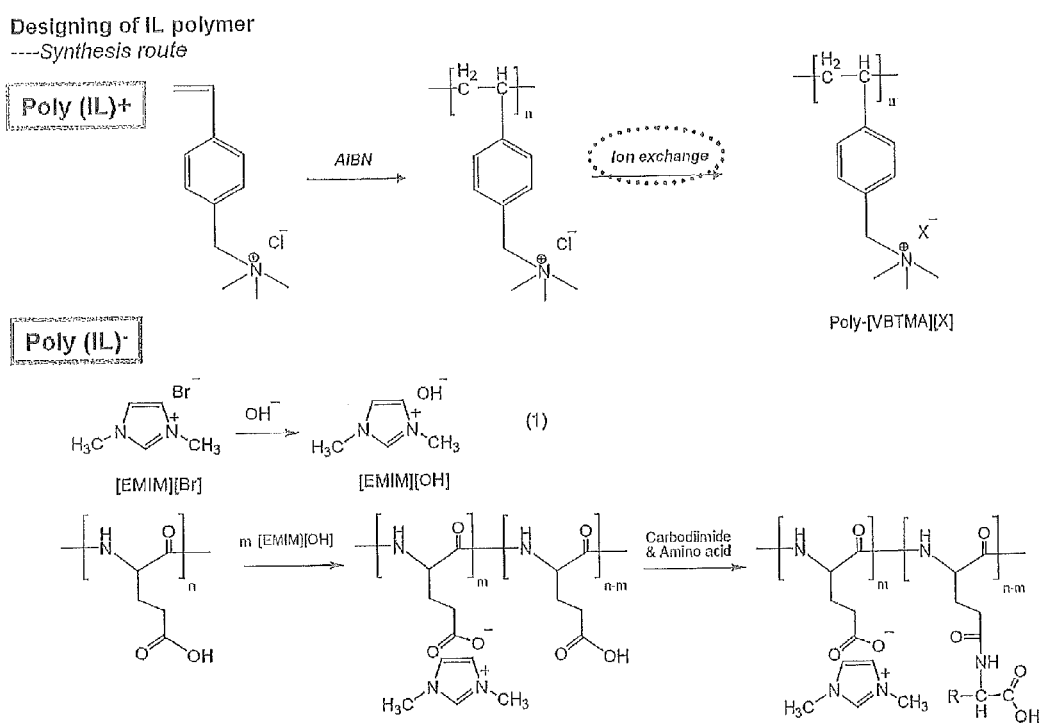
FIG. 24 shows the synthesis routes for the Poly(IL)- and Poly(IL)+ of the present invention.
Figure 26:
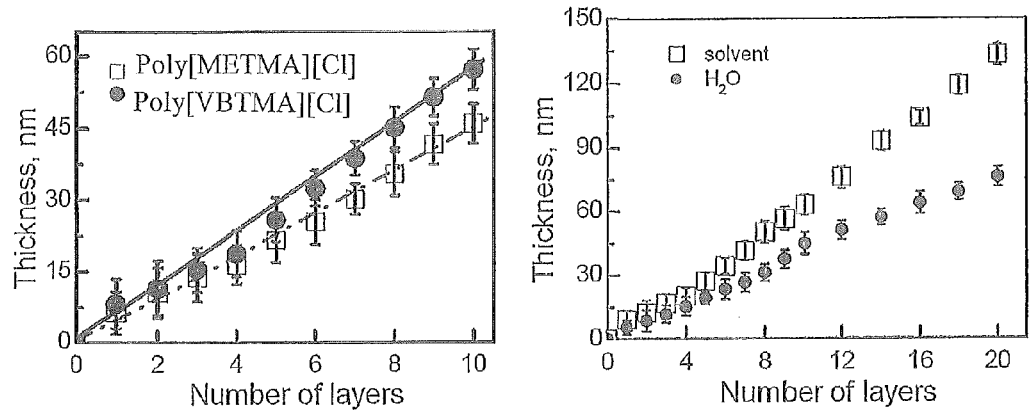
FIG. 26 show the effect of poly(IL) on LBL (layer by layer) film formation.
Figure 27:
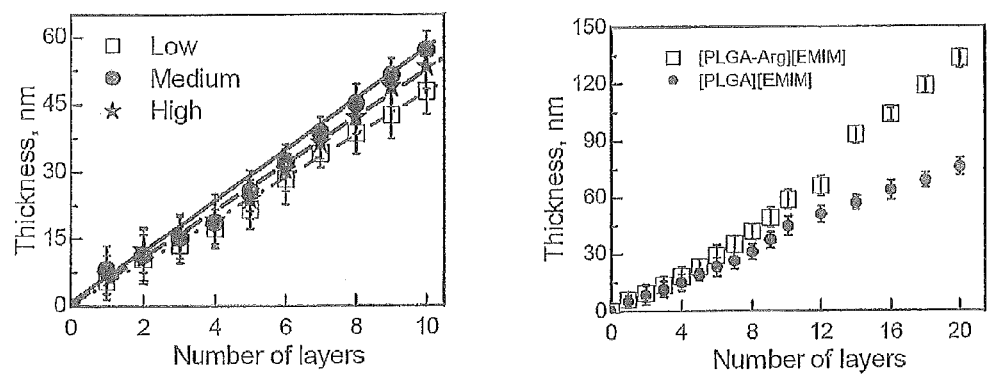
FIG. 27 shows the effect of poly(IL) on LBL (layer by layer) film formation.

Rhodamine B-labeled PEI was used to monitor the weight loss of nano-layers from 10-bilayered PEI/PSS sorbents. A standard curve was obtained by recording the peak absorbance at 552 nm of labeled PEI solutions of known concentrations. 100 mg of the sorbents was suspended in 2 ml deionized water and then incubated in a water bath (40° C.). At predetermined time periods, 0.4 ml of the supernatant was taken for UV-vis measurements to quantify possible disassembly or destruction of PEI from the sorbents. An equal volume of fresh deionized water was added to keep a constant volume of the medium. All measurements were conducted in duplicates. Sorbent stability in water was calculated from the following equation: Sorbent stability (%)=[(Loaded PEI in sorbents−Disassembled PEI from sorbents)/Loaded PEI in sorbents]×100% PEI/PSS sorbents were found to be stable in water and, within 14 days, approximately 1% of PEI was diffused out of the sorbents in water (see FIG. 15).

Figure 28:
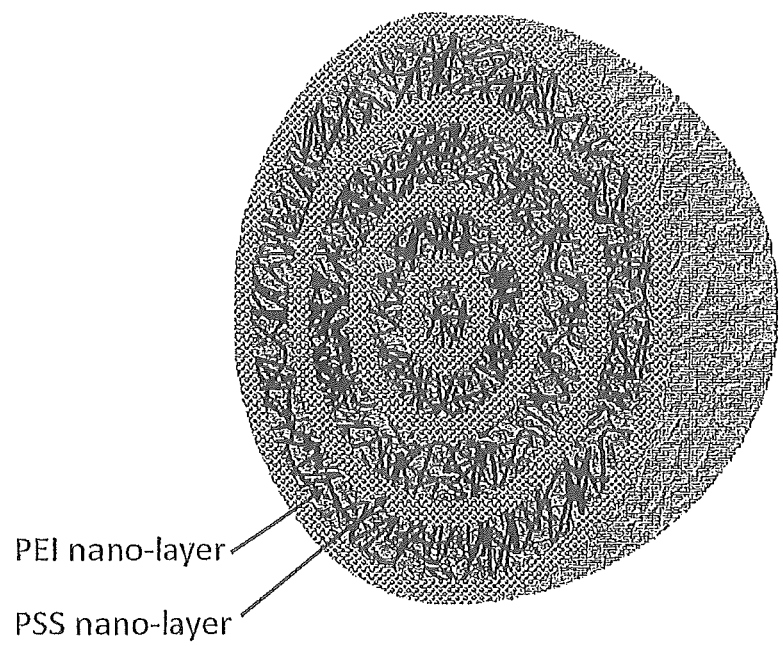
FIG. 28 shows an example of a layered sorbent structure of the present invention having at least one PEI nano-layer and at least one PSS nano-layer.

Thus, it will be appreciated by those persons skilled in the art that the sorbent of the present invention is made of at least two layers and preferably multiple layers (most preferably at least ten layers, as described herein. Each layer may be different with at least one layer of a material that selectively adsorbs CO$_2$ or other greenhouse gases, for example but not limited to a PEI nano-layer, and with at least another layer of a material that facilitates the transport of CO$_2$ or other gases. It will be understood that the thickness of each layer is preferably to be on the nanometer scale but may be in the range of a micrometer or larger. The layered material may stand alone, be coated on the surface of a support, for example but not limited to a PMMA support, or be embedded in a support, for example but not limited to a PMMA support. The sorbents of this invention may be used to capture not only CO$_2$ but also be used to capture other materials for example but not limited to heavy metals for energy, environmental, and biological applications. An example of the layered sorbents of the present invention is shown in FIG. 28. FIG. 28 shows two types of layers, namely, a PSS nano layer and a PEI nano layer. Other embodiments of the present invention provide wherein more than two types of layers may be included in the sorbents of the present invention, for example alternating layers of positively and negatively charged materials such as polyelectrolytes, polymers, and ionic liquid monomers and polymers, as described herein. Each layer may be made of a single chemical or a mixture of chemicals. For achieving the removal of CO$_2$, at least one type of layer is required to capture carbon dioxide and at least one layer is required to facilitate carbon dioxide transport. Other layers may be added for achieving other properties, such as for example, but not limited to a layer for thermal conductivity and a catalytic property. The layers of the sorbents of the present invention may be manufactured using such techniques as for example but not limited to, as Lbl nanoassembly (layer by layer self assembly), spin coating, spray coating, and sputtering, all of which are known by those skilled in the art.

In another embodiment of the invention, in large scale applications, silica-based materials, which are described extensively in the scientific literature with improved thermal stability and better hydrophobic properties, are an alternative choice than polymeric materials produced by the LbL nanoassembly which may exhibit undesirable swell/shrink properties leading to shorter lifespans. Furthermore, the polar nature of the silica supported polyamine materials allows for better mass-transfer kinetics; along with being easily modified with functional groups of interest.

A method of capturing carbon dioxide from a pollutant source comprising passing an effluent stream of gas containing carbon dioxide through or in contact with the surface of a solid sorbent comprising at least one first layer of a material that captures at least a portion of a gas; and at least one second layer of a second material that transports said gas, said second layer of material is in juxtaposition to, attached to, or crosslinked with said first layer such that said first layer of material and said second layer of material form one bilayer; and a solid substrate support having a porous surface, wherein said bilayer is deposited on the surface of said substrate or deposited into said solid substrate; and capturing said carbon dioxide on said surface of said substrate or depositing said carbon dioxide into said solid substrate. Preferably, this method includes passing the effluent stream of gas containing the carbon dioxide through or in contact with the surface of the solid sorbent of this invention, as described hereinbefore.

The various embodiments described herein are merely descriptive of the present invention and are in no way intended to limit the scope of the invention. Numerous variations and modifications of the present invention will become evident to those persons having skill in the art in light of the detailed description herein, and such variations and modifications may be made without departing from the invention as defined in the figures and the scope of the appended claims.

What is claimed is:

1. A solid sorbent comprising:
   at least one first layer of a material that captures at least a portion of a gas, wherein said first layer of said material is selected from the group consisting of polyethylenimine and poly(allylamine hydrochloride); and
   at least one second layer of a second material that transports said gas, wherein said second layer of material is selected from the group consisting of polystyrenesulfonate and poly(acryclic acid), or wherein said first and said second layers of materials are selected from the group of ionic liquid monomers and poly-ionic liquid polymers, said second layer of material is in juxtaposition to, attached to, or crosslinked with said first layer such that said first layer of material and said second layer of material form one bilayer; and
   a solid substrate support having a porous surface, wherein said bilayer is deposited on the surface of said substrate or deposited into said solid substrate.

2. The solid sorbent of claim 1 having alternating layers of said first layer of material and said second layer of material forming more than one bilayer.

3. The solid sorbent of claim 1 wherein said first layer of said material is different than said second layer of said material.

4. The solid sorbent of claim 1 wherein said first layer of material is a positively charged material and wherein said second layer of material is an oppositely charged material relative to the first layer of material.

5. The solid sorbent of claim 4 wherein the first layer of material is a positively charged polyelectrolyte and wherein said second layer of material is a negatively charged polyelectrolyte.

6. The solid sorbent of claim 1 wherein said first layer is a positively charged polymer and wherein said second layer is an oppositely charged polymer relative to the polymer of said first layer.

7. The solid sorbent of claim 1 wherein said solid substrate support is selected from the group consisting of polymethylmethacrylate, silica, silicone, glass, a metal, and a colloid of an inorganic and organic material.

8. The solid sorbent of claim 1 wherein said porosity of said solid substrate support has a diameter ranging from 1 nanometer to greater than 200 nanometers.

9. The solid sorbent of claim 1 wherein said bilayer has a thickness of at least 1 nanometer.

10. The solid sorbent of claim 9 wherein there are at from 2 to 10 bilayers wherein each bilayer has a thickness of from 1 to 10 nanometers.

11. The solid sorbent of claim 1 wherein the ionic liquid monomers are selected from the group of noncrosslinked and crosslinked monomers.

12. The solid sorbent of claim 1 wherein said first layer of material is polyethylenimine and said second layer of material is polystyrenesulfonate.

13. The solid sorbent of claim 1 wherein said poly ionic liquid polymer is formed from monomers selected from the group consisting of 2-(methacryloyloxy)ethyl-trimethylammonium chloride, p-vinylbenzonyltrimethylammonium chloride, arginine, aspartic acid, PLGA, EMIM, and combinations thereof.

14. The solid sorbent of claim 13 wherein said poly ionic liquid polymer is selected from the group of poly[p-vinylbenzonyltrimethylammonium chloride][Cl], poly[p-vinylbenzonyltrimethylammonium chloride][Arg], poly[2-(methacryloyloxy)ethyl-trimethylammonium chloride][Cl], [PLGA][EMIM], and [PLGA-Arginine][EMIM].

15. The solid sorbent of claim 1 wherein said poly ionic liquid polymer is poly [METMA][Arginine][Aspartic acid] a copolymer synthesized from polymerization of [2-(methacryloyloxy)ethyltrimethylammonium chloride][Arginine] and [2-(methacryloyloxy)ethyltrimethylammonium chloride][Aspartic acid].

16. A solid sorbent comprising:
    at least one first layer of a material that captures at least a portion of a gas, wherein said first layer of said material is selected from the group consisting of polyethylenimine and poly(allylamine hydrochloride); and
    at least one second layer of a second material that transports said gas, wherein said second layer of material is selected from the group consisting of polystyrenesulfonate and poly(acryclic acid), or wherein said first and said second layers of materials are selected from the group of ionic liquid monomers and poly-ionic liquid polymers, said first layer of material and said second layer of material form one bilayer; and
    a solid substrate support having a porous surface, wherein said bilayer is deposited on the surface of said substrate or deposited into said solid substrate.

17. The solid sorbent of claim 16 having alternating layers of said first layer of material and said second layer of material forming more than one bilayer.

18. The solid sorbent of claim 16 wherein said first layer of material is a positively charged material and wherein said second layer of material is an oppositely charged material relative to the first layer of material.

19. The solid sorbent of claim 18 wherein the first layer of material is a positively charged polyelectrolyte and wherein said second layer of material is a negatively charged polyelectrolyte.

20. The solid sorbent of claim 18 wherein said first layer is a positively charged polymer and wherein said second layer is an oppositely charged polymer relative to the polymer of said first layer.

21. The solid sorbent of claim 16 wherein said solid substrate support is selected from the group consisting of polymethylmethacrylate, silica, silicone, glass, a metal, and a colloid of an inorganic and organic material.

22. The solid sorbent of claim 16 wherein said porosity of said solid substrate support has a diameter ranging from 1 nanometer to greater than 200 nanometers.

23. The solid sorbent of claim 16 wherein said bilayer has a thickness of at least 1 nanometer.

24. The solid sorbent of claim 16 wherein there are at from 2 to 10 bilayers wherein each bilayer has a thickness of from 1 to 10 nanometers.

25. The solid sorbent of claim 16 wherein the ionic liquid monomers are selected from the group of noncrosslinked and crosslinked monomers.

26. The solid sorbent of claim 16 wherein said first layer of material is polyethylenimine and said second layer of material is polystyrenesulfonate.

27. The solid sorbent of claim 16 wherein said poly ionic liquid polymer is formed from monomers selected from the group consisting of 2-(methacryloyloxy)ethyl-trimethylammonium chloride, p-vinylbenzonyltrimethylammonium chloride, arginine, aspartic acid, PLGA, EMIM, and combinations thereof.

28. The solid sorbent of claim 16 wherein said poly ionic liquid polymer is selected from the group of poly[p-vinylbenzonyltrimethylammonium chloride][Cl], poly[p-vinylbenzonyltrimethylammonium chloride][Arg], poly[2-(methacryloyloxy)ethyl-trimethylammonium chloride][Cl], [PLGA][EMIM], and [PLGA-Arginine][EMIM].

29. The solid sorbent of claim 16 wherein said poly ionic liquid polymer is poly [METMA][Arginine][Aspartic acid]a copolymer synthesized from polymerization of [2-(methacryloyloxy)ethyltrimethylammonium chloride][Arginine] and [2-(methacryloyloxy)ethyltrimethylammonium chloride][Aspartic acid].

* * * * *